United States Patent
Joo

(10) Patent No.: US 11,651,592 B2
(45) Date of Patent: May 16, 2023

(54) IMAGE PROCESSING APPARATUS, VEHICLE HAVING THE SAME AND CONTROL METHOD THEREOF

(71) Applicants: Hyundai Motor Company, Seoul (KR); Kia Motors Corporation, Seoul (KR)

(72) Inventor: YoungSung Joo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 225 days.

(21) Appl. No.: 17/102,991

(22) Filed: Nov. 24, 2020

(65) Prior Publication Data

US 2021/0383125 A1 Dec. 9, 2021

(30) Foreign Application Priority Data

Jun. 8, 2020 (KR) .......................... 10-2020-0069046

(51) Int. Cl.
*G06V 20/40* (2022.01)
*G06T 5/20* (2006.01)
(Continued)

(52) U.S. Cl.
CPC .............. *G06V 20/46* (2022.01); *G06T 5/009* (2013.01); *G06T 5/20* (2013.01); *G06V 20/58* (2022.01); *G06V 20/586* (2022.01)

(58) Field of Classification Search
CPC . G06T 7/20; G06T 7/254; G06T 2207/10016; G06T 7/74; G06T 7/00;
(Continued)

(56) References Cited

U.S. PATENT DOCUMENTS

2011/0134120 A1* 6/2011 Antonyuk ............. G06F 3/1454
345/426
2012/0229646 A1* 9/2012 Grandidier .............. G06T 7/254
348/149

(Continued)

FOREIGN PATENT DOCUMENTS

KR 10-2013-0131695 A 12/2013
KR 10-1531191 B1 6/2015

OTHER PUBLICATIONS

Low Complexity Image Compression for Wireless Multimedia Sensor Networks—2011 (Year: 2011).*

(Continued)

*Primary Examiner* — Nizar N Sivji
(74) *Attorney, Agent, or Firm* — Fox Rothschild LLP

(57) ABSTRACT

A vehicle is provided and includes an image acquisition device and an image processing apparatus that receives an original frame for an image obtained by the image acquisition device at a set time interval in the parking state and obtains a key frame having the same pixel with each other by comparing a plurality of original frames received at the set time interval. The image processing apparatus obtains a plurality of delta frames having pixels different from the reference original frame from remaining original frames by comparing each of the reference original frame and the remaining original frames among the plurality of frames and compresses the key frame and the plurality of delta frames, respectively. A storage device stores the key frame and a plurality of delta frames compressed by the image processing apparatus.

26 Claims, 18 Drawing Sheets

(51) Int. Cl.
*G06T 5/00* (2006.01)
*G06V 20/58* (2022.01)

(58) Field of Classification Search
CPC ........... G06T 2207/10004; G06T 7/174; G06T 5/009; G06T 5/20; G06K 9/00785; G06K 2209/23; G06K 9/00771; G06K 9/00624; G06K 9/00744; G06K 9/00805; G06K 9/00812

See application file for complete search history.

(56) References Cited

U.S. PATENT DOCUMENTS

| | | | |
|---|---|---|---|
| 2018/0152667 A1* | 5/2018 | Taine | G06T 7/11 |
| 2018/0308330 A1* | 10/2018 | Selinger | G08B 13/19663 |
| 2019/0035091 A1* | 1/2019 | Bi | H04N 5/247 |
| 2019/0130583 A1* | 5/2019 | Chen | G06K 9/00711 |
| 2019/0200046 A1* | 6/2019 | Lucas | H04N 19/124 |
| 2019/0261007 A1* | 8/2019 | Emmanuel | H04W 24/02 |
| 2019/0261243 A1* | 8/2019 | Amini | H04L 43/0858 |
| 2021/0192692 A1* | 6/2021 | Takatsuka | H04N 5/351 |
| 2021/0209388 A1* | 7/2021 | Ciftci | G06K 9/00718 |

OTHER PUBLICATIONS

Key Frame Extraction from MPEG Video Stream—2010 (Year: 2010).*
Automatic detection of long term parked cars—2015 (Year: 2015).*

* cited by examiner $R(val) = P(val) \times (dx) + Q(val) \times (1-dx)$

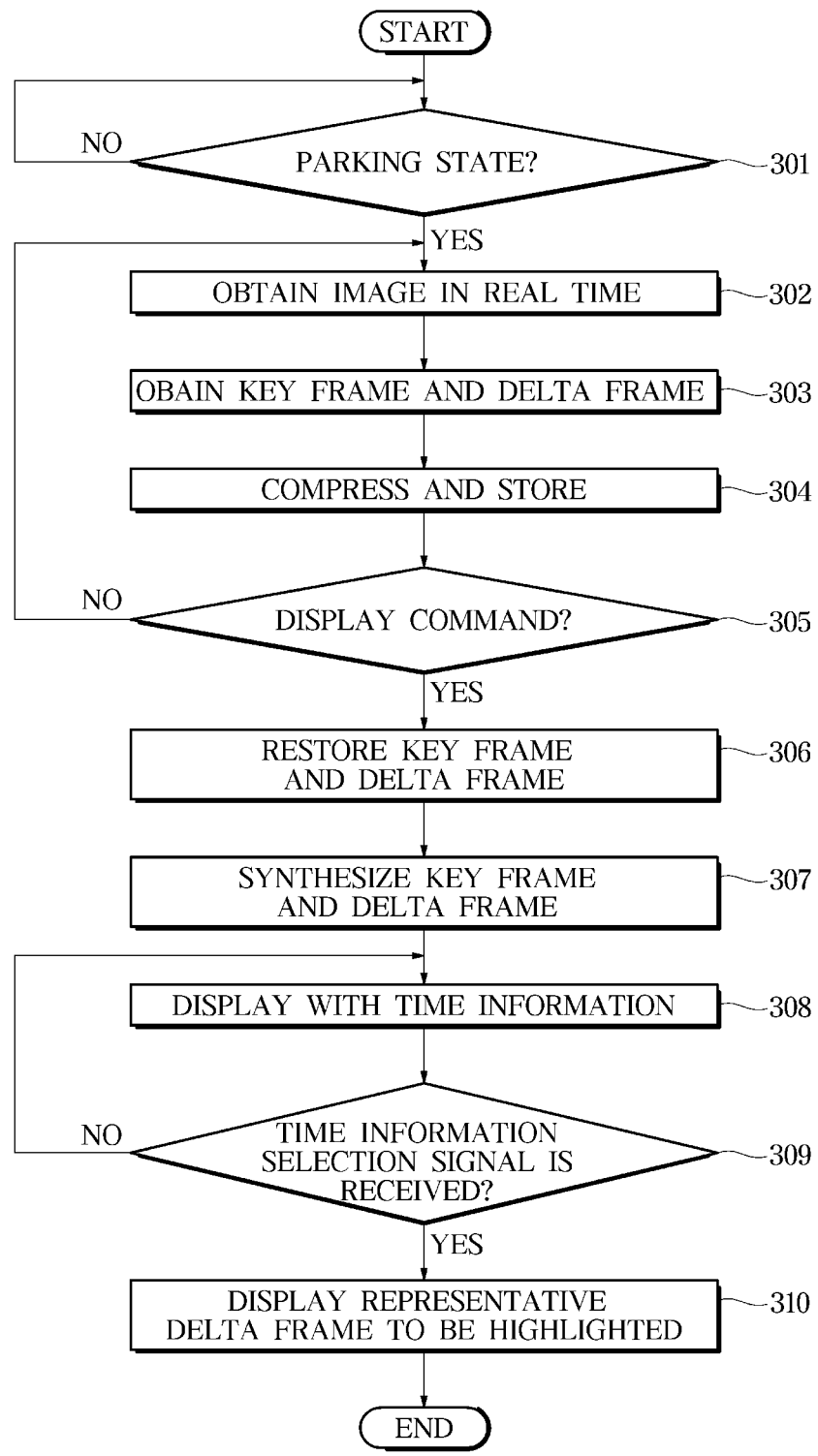

IMAGE PROCESSING APPARATUS, VEHICLE HAVING THE SAME AND CONTROL METHOD THEREOF

CROSS-REFERENCE TO RELATED APPLICATION(S)

This application is based on and claims priority under 35 U.S.C. § 119 to Korean Patent Application No. 10-2020-0069046, filed on Jun. 8, 2020 the disclosure of which is incorporated by reference in its entirety.

BACKGROUND

1. Technical Field

The disclosure relates to an image processing apparatus for obtaining an external image and storing and displaying the obtained image, a vehicle having the same, and a control method thereof.

2. Description of the Related Art

Vehicles may perform basic driving functions and additional functions for user convenience, for example, an audio function, a video function, a navigation function, an air-conditioning control function, a seat heating function, an external image obtainment function (black box function), a communication function with an external terminal, and the like. The external image obtainment function may include a function of obtaining an image of the rear side of the vehicle while parking and a function of obtaining an image of the front side of the vehicle while driving.

In other words, the vehicle performs a parking assist function by obtaining the image of the rear of the vehicle during parking and displaying the obtained image and obtains the surrounding image while stopping or driving the vehicle, and stores and displays the obtained image to be used to analyze the cause of an accident. In addition, when the vehicle has an autonomous driving function, the vehicle may use the obtained front image as information for autonomous driving.

When performing this external image acquisition function, the vehicle must be able to obtain and store images in real time. Accordingly, an image processing device for obtaining, storing, and displaying images must be provided in the vehicle, and a storage device having a large storage capacity must be provided. As a result, the unit cost of a vehicle or image processing device is increased.

In addition, when a user searches for an image of an event occurrence time among stored images, it is inconvenient to search by looking at a substantial number of images stored in a storage device one by one, which takes a lot of time to search the image. When parking for a long time, old images are also deleted due to insufficient storage capacity of the storage device.

SUMMARY

Therefore, it is an aspect of the present disclosure to provide an image processing apparatus for compressing and storing the same pixel among a plurality of images into one, separately compressing and storing different pixels, restoring a compressed image when displaying an image and displaying it as a single image and displaying images with different pixels within one image, a vehicle having the same, and a control method thereof. In addition, it is another aspect of the present disclosure to provide an image processing apparatus that matches and displays an image having different pixels among a plurality of images with obtained time information, a vehicle having the same, and a control method thereof.

In accordance with one aspect of the disclosure, an image processing apparatus may include: a transceiver configured to communicate with a vehicle and receive first and second original frames of image obtained by an image acquisition device at set time interval; and a controller configured to confirm the same pixels between the received first original frame and second original frame, obtain a key frame including the confirmed same pixels, confirm pixels different from pixels of the received first original frame among the pixels of the received second original frame, obtain a delta frame including the confirmed different pixels, and compress and store the key frame and the delta frame, respectively.

The controller may be configured to restore the stored key frame and delta frame in response to receiving a display command from the transceiver, synthesize the restored key frame and the delta frame and transmit the synthesized key frame and delta frame to the display. The controller may be configured to execute the restoration using a linear interpolation method. In response to receiving a display command from the transceiver while a plurality of delta frames are stored, the controller may be configured to restore the stored key frame and the plurality of delta frames, respectively, and overlap the restored plurality of delta frames with the restored key frame.

The controller may be configured to confirm a position information of the pixels of the plurality of delta frames and determine a position for overlap based on the confirmed position information of pixels for each of the plurality of delta frames. In response to receiving a selection signal of any one delta frame from the transceiver, the controller may be configured to display the any one delta frame differently from the remaining delta frame among the plurality of delta frames. In response to receiving a selection signal of any one delta frame from the transceiver, the controller may be configured to synthesize only the one delta frame among the plurality of delta frames with the key frame and display it.

The controller may be configured to match time information obtained by the received second original frame with the delta frame and store it. In response to receiving environmental information from the transceiver, the controller may be configured to adjust at least one of brightness and color of the first and second original frames based on the received environmental information, and the environmental information may include at least one of current time information, weather information, season information, and illumination information.

In accordance with one aspect of the disclosure, a control method of an image processing apparatus may include: receiving an original frame for an image obtained by the image acquisition device at a set time interval; obtaining a key frame having the same pixel with each other by comparing a plurality of original frames received at the set time interval; obtaining a plurality of delta frames having pixels different from the reference original frame from the remaining original frames by comparing each of the reference original frame and the remaining original frames among the plurality of frames; compressing and storing the key frame and the plurality of delta frames, respectively; restoring the stored key frame and the stored plurality of delta frames when a display command is received by user input; and synthesizing the restored key frame and the restored plurality of delta frames and displaying them through a display.

The compressing and storing the plurality of delta frames may include: confirming original frames that correspond to each of the plurality of delta frames; confirming each time information in which the confirmed original frames are obtained; and matching and storing the plurality of delta frames and the respective confirmed time information. The synthesizing of the restored key frame and the restored plurality of delta frames may include: displaying time information stored by matching with the plurality of delta frames, together.

The control method may further include: when any one time information is selected by the user input, displaying a delta frame having the selected time information differently from the remaining delta frame. The control method may further include: when any one time information is selected by the user input, displaying only the delta frame having the selected time information The compressing and storing of the plurality of delta frames may include: confirming a position information of the pixels of the plurality of delta frames, respectively; and storing a position information of pixels for each of the plurality of delta frames. The synthesizing of the restored key frame and the restored plurality of delta frames may include: synthesizing the plurality of delta frames into the key frame based on position information of pixels for each of the plurality of delta frames.

The control method may further include: when environmental information is received from the transceiver, adjusting at least one of brightness and color of the plurality of original frames based on the received environmental information, and the environmental information may include at least one of current time information, weather information, season information, and illumination information.

In accordance with another aspect of the disclosure, a vehicle may include: an image acquisition device; an image processing apparatus configured to receive an original frame for an image obtained by the image acquisition device at a set time interval in the parking state, obtain a key frame having the same pixel with each other by comparing a plurality of original frames received at the set time interval, obtain a plurality of delta frames having pixels different from the reference original frame from the remaining original frames by comparing each of the reference original frame and the remaining original frames among the plurality of frames and compress the key frame and the plurality of delta frames, respectively; and a storage device configured to store the key frame and a plurality of delta frames compressed by the image processing apparatus.

The vehicle may further include: an input device; and a display, and when a display command is received from the input device, the image processing apparatus may be configured to restore a key frame and a plurality of delta frames stored in the storage device, synthesize the restored key frame and the restored plurality of delta frames and display it through the display. The image processing apparatus may be configured to confirm original frames corresponding to each of the plurality of delta frames, confirm each time information in which the confirmed original frames are obtained, match and store the plurality of delta frames and the respective confirmed time information, and in response to receiving the display command, display time information corresponding to the plurality of delta frames together with the restored key frame and the restored plurality of delta frames.

The vehicle may further include: an illuminance detector configured to detect illuminance, and the image processing apparatus may be configured to adjust at least one of brightness and color of the plurality of original frames based on the illuminance detected by the illuminance detector. The vehicle may further include: an impact detector configured to detect external impact, and the image processing apparatus may be configured to determine whether an event occurs based on the impact information detected by the impact detector, and in response to determining that the event occurs, store information regarding the delta frame obtained at the time of the event occurrence.

In accordance with another aspect of the disclosure, an image processing apparatus may include: a transceiver configured to communicate with a vehicle and receive first and second original frames of image obtained by an image acquisition device at set time interval; and a controller configured to confirm the same pixels between the received first original frame and second original frame, obtain a key frame including the confirmed same pixels, confirm pixels different from pixels of the received first original frame among the pixels of the received second original frame, obtain a delta frame including the confirmed different pixels, and compress and store the key frame and the delta frame, respectively, and, when a playback command is received from the transceiver while a plurality of delta frames are stored, the controller is configured to restore the stored key frame and the plurality of delta frames, respectively, and simultaneously play the restored plurality of delta frames in the restored key frame.

The plurality of delta frames may include pixels obtained from images obtained by the image acquisition device at the same time as each other. The plurality of delta frames may include pixels obtained from images obtained by the image acquisition device at different times as each other.

In accordance with another aspect of the disclosure, an image processing apparatus may include: a transceiver configured to communicate with a vehicle, receive first and second original frames of image obtained by an image acquisition device at set time interval, and receive an event information of the vehicle; and a controller configured to confirm the same pixels between the received first original frame and second original frame, obtain a key frame including the confirmed same pixels, confirm pixels different from pixels of the received first original frame among the pixels of the received second original frame, obtain a delta frame including the confirmed different pixels, and compress and store the key frame and the delta frame, respectively, and, in response to receiving a display command is received from the transceiver while a plurality of delta frames are stored, the controller is configured to restore the stored key frame and the plurality of delta frames, respectively, and simultaneously display the restored plurality of delta frames in the restored key frame, and confirm the first delta frame obtained at the time when the event information is received among the plurality of delta frames, when a partial area of the first delta frame overlaps with a partial area of a partial second delta frame among the remaining delta frames, display the entire area of the first delta frame. The controller may be configured to control non-display of a partial area of the second delta frame overlapped with a partial area of the first delta frame.

In accordance with another aspect of the disclosure, an image processing apparatus may include: a transceiver configured to communicate with a vehicle, receive first and second original frames of image obtained by an image acquisition device at set time interval, and receive an event information of the vehicle; and a controller configured to confirm the same pixels between the received first original frame and second original frame, obtain a key frame including the confirmed same pixels, confirm pixels different from pixels of the received first original frame among the pixels of the received second original frame, obtain a delta frame including the confirmed different pixels, and compress and store the key frame and the delta frame, respectively.

In response to receiving a playback command from the transceiver while a plurality of delta frames are stored, the controller may be configured to restore the stored key frame and the plurality of delta frames, respectively, and simultaneously play the restored plurality of delta frames in the restored key frame, and confirm the first delta frame obtained at a first time point before a first predetermined time from the time point at which the event information is received among the plurality of delta frames, confirm the second delta frame obtained at a second time point after a second predetermined time from the time point at which the event information is received, simultaneous playback of the first delta frame and the second delta frame obtained during a time between the first time point and the second time point.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 5 is a flowchart illustrating an image processing apparatus according to an exemplary embodiment.

DETAILED DESCRIPTION

Figure 1:
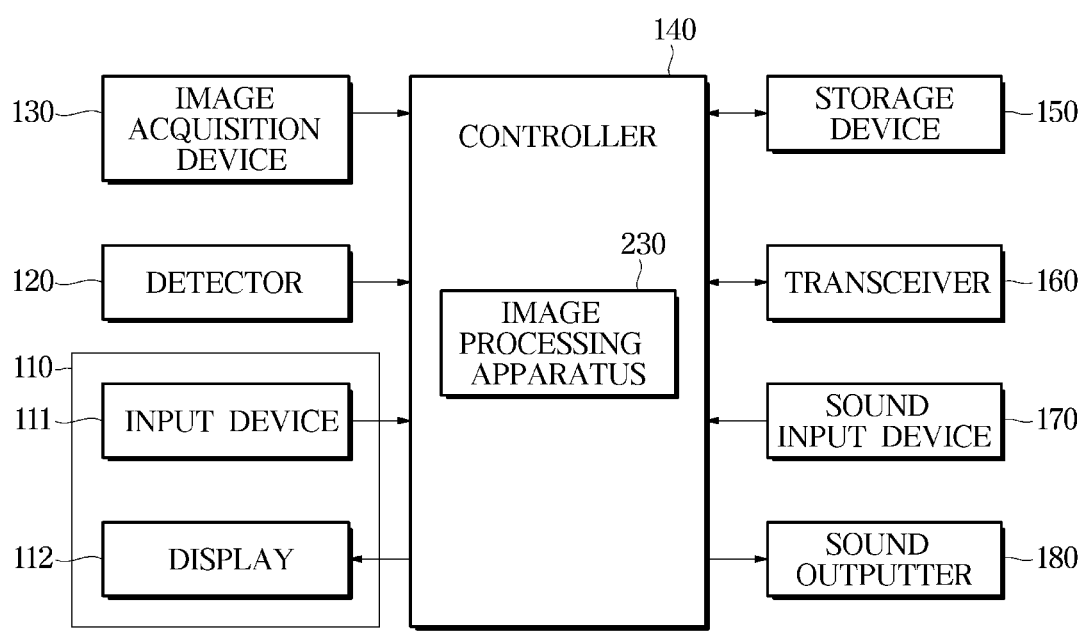
FIG. 1 is a control configuration diagram of a vehicle including an image processing apparatus according to an exemplary embodiment.
Figure 2D:
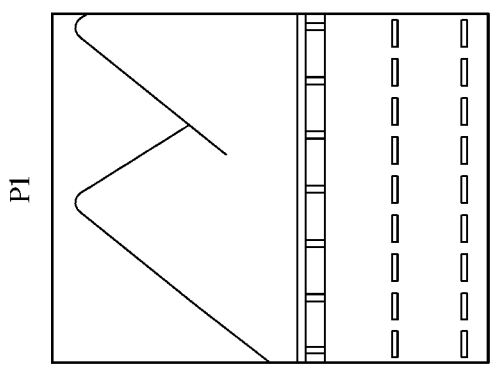
FIGS. 2A-2D are exemplary diagrams illustrating acquisition of a key frame and a delta frame of the image processing apparatus shown in FIG. 1 according to another exemplary embodiment.
Figure 2C:
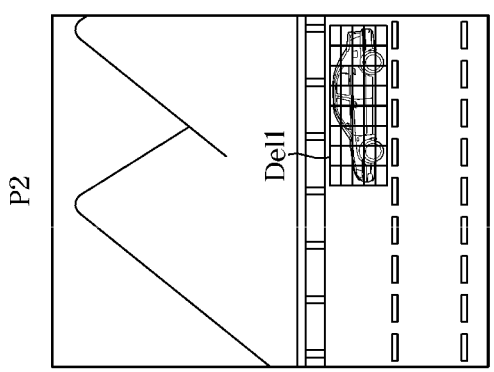
Figure 2B:
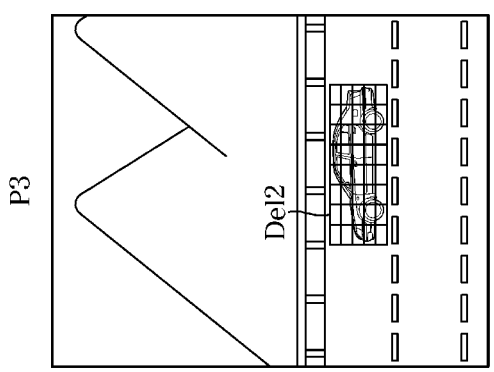
Figure 2A:
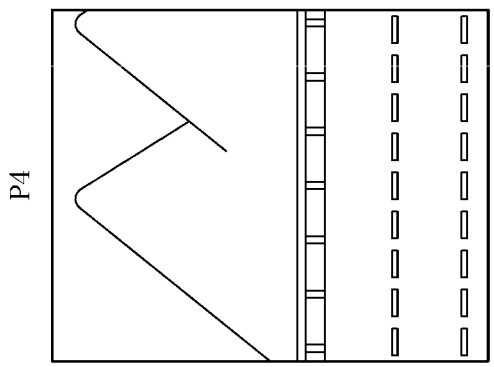

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of the exemplary embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network. The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Hereinafter, an operation principle and exemplary embodiments of the disclosure will be described with reference to accompanying drawings. The vehicle 1 may include a body having an exterior and an interior, and a chassis on which mechanical devices necessary for driving are installed as the rest of the vehicle body. The exterior of the vehicle body includes a front panel, a bonnet, a roof panel, a rear panel, a front/rear/left/right door, and a window provided to be opened and closed on the front, rear, left and right doors, and fixedly installed at the front and rear of the vehicle. The exterior of the vehicle body includes a pillar provided at a boundary between the front, rear, left and right doors and window glasses, and a side mirror that provides the driver with a view of the rear of the vehicle 1.

The interior of the vehicle body includes a seat on which the occupant sits, the dashboard, the instrument panel (i.e. cluster), a center fascia on which the air conditioner's vents and control plates are arranged, and a head unit provided in the center fascia to receive operation commands of audio device and air conditioners. The vehicle further includes a shift lever provided on the center fascia for inputting an operation position, and a parking button (e.g., EPB button) positioned at the periphery of the shift lever or at the head unit and receiving an operation command of an electronic parking brake device (not shown).

The vehicle chassis is a frame that supports the vehicle body. Wheels arranged in front, rear, left and right, a power device for applying driving force to the front, rear, left and right wheels, steering device, a braking device for applying braking force to the front, rear, left and right wheels, and a suspension device for adjusting the suspension of the vehicle may be provided on the chassis.

The vehicle 1 may include an image processing apparatus 230 configured to obtain information about the surrounding situation of the vehicle as an image and store and output the obtained image for the safety and convenience of the user. The control configuration of such a vehicle will be described with reference to FIG. 1. FIG. 1 is a control configuration diagram of a vehicle including an image processing apparatus according to an exemplary embodiment.

The vehicle 1 may further include an input device 111, a display 112, a detector 120, an image acquisition device 130, a controller 140 having an image processing apparatus 230, a storage device 150, a transceiver 160, a sound input device 170 and a sound output device 180. The input device 111 may be configured to receive a user input and receive operation commands for various functions that may be performed in the vehicle. The input device 111 may be configured to receive an image acquisition, image search, and image playback command. Additionally, the input device 111 may be configured to receive information of a time when an image is stored during image search and image playback.

In order to select at least one of the plurality of event images, the input device 111 may be configured to receive time information matched with the plurality of event images. The input device 111 may also be configured to receive a command to delete the stored image. The input device 111 may be disposed on the head unit and the center fascia and may include a plurality of buttons. In addition, the input device 111 may include a plurality of buttons provided on the steering wheel, and may include buttons provided on an operation lever (not shown) around the steering wheel.

The input device 111 may further include a jog dial (not shown) or a touch pad (not shown) for inputting a movement command and selection command of a cursor displayed on the display 112. In particular, the jog dial or touch pad may be disposed on a center fascia. The display 112 may be configured to display information on various functions that may be performed in the vehicle, information on various functions being performed in the vehicle, and display information input by a user. The display 112 may be configured to display an image stored in the storage device 150 and simultaneously display a plurality of event images on one screen when displaying images stored in the storage device 150. The display 112 may be disposed on the head unit.

The input device 111 and the display 112 may be provided as one device. In other words, the input device 111 and the display 112 may be integrated to be provided as a vehicle terminal. The vehicle terminal 110 may be configured to display an image of at least one function selected by a user among an audio function, a video function, a navigation function, a broadcasting function (DMB function), a radio function, a content playback function, and an Internet search function.

The vehicle terminal 110 may be installed in a buried or stationary manner on a dashboard. The vehicle terminal 110 may include a display panel as the display 112 and may further include a touch panel as the input device 111. In other words, the vehicle terminal 110 may include a touch screen in which the touch panel is integrated with the display panel. The detector 120 (e.g., a sensor) may be configured to detect driving information of a vehicle. The detector 120 may further include a speed detector (e.g., sensor) configured to detect the driving speed of the vehicle.

In particular, the speed detector may include a plurality of wheel speed sensors each provided on a plurality of wheels of the vehicle, and may include an acceleration sensor configured to detect acceleration of the vehicle. The detector 120 may be configured to detect the position of the shift lever, and detect the operation state of the electronic parking brake. The detector 120 may also be configured to detect a start-up on-off signal. The detector 120 may further include an impact detector configured to detect an external impact or a sound detector configured to detect a sound having a loudness over a certain level. The image acquisition device 130 may be configured to obtain images around the vehicle in real time.

The image acquisition device 130 may include at least one or a plurality of cameras or other imaging devices configured to acquire road images at the front, rear, left and right directions of the vehicle. In other words, the image acquisition device 130 may be a camera, and may include a CCD or CMOS image sensor, and a three-dimensional space recognition sensor such as KINECT (RGB-D sensor), TOF (Structured Light Sensor), stereo camera, etc. The image acquisition device 130 may also include a rotatable camera. In this exemplary embodiment, an image acquisition device including four cameras is described as an example.

The image acquisition device 130 may include a first camera configured to obtain or capture an image in the front direction of the vehicle, a second camera configured to obtain or capture an image in the rear direction of the vehicle, a third camera configured to obtain or capture an image in the left direction of the vehicle, and a fourth camera configured to obtain or capture an image in the right direction of the vehicle. The image acquisition device 130 may be a camera provided in a black box, a camera of an autonomous driving control device for autonomous driving, or a camera for detecting obstacles. The image acquisition device 130 may include a camera of a Surround View Monitor (SVM or AVM), a camera of a blind spot detection device (BSD), or a camera of a rear detection device.

The first camera may be disposed on the front window glass of the front of the vehicle and disposed on the window inside the vehicle to face the outside of the vehicle, or may be disposed in the rearview mirror inside the vehicle but facing the outside of the vehicle, or may be disposed on a license plate, grille, emblem, front panel, or roof panel, but may be disposed to be exposed to the outside. The second camera may be disposed on the rear window glass at the rear of the vehicle, but may be disposed on the window inside the vehicle to face the outside of the vehicle, or may be disposed on the tail gate, and disposed on the license plate, roof panel, rear panel or emblem. However, it may be disposed to be exposed to the outside. The third camera may be disposed in a left side mirror, a left door, or a left fender. The fourth camera may be disposed in a right side mirror, a right door, or a right fender. In addition, the fourth camera may be disposed around the rear panel, around the emblem, or around the license plate.

This image acquisition device 130 may be configured to convert shape information of objects around the vehicle into electrical image signals, and transmit an image signal corresponding to shape information of an environment outside the host vehicle, particularly a road on which the vehicle is driving, and objects in the front, rear, and left and right sides of the host vehicle at the current position of the host vehicle to the controller 140, and transmit an image signal that corresponds to shape information of objects around the vehicle to the controller 140 even when stopping or parking. The image acquisition device 130 may be configured to obtain an image in real time. In other words, the image acquisition device 130 may be configured to obtain an image of a moving image.

The controller 140 may be configured to determine whether the vehicle is in a driving state, a stopped state, or a parking state based on the detection information detected by the detector 120, and transmit state information on the determined state of the vehicle to the image processing apparatus 230. The controller 140 may be configured to obtain vehicle state information based on at least one of driving speed information, acceleration information, yaw rate information, information corresponding to the operation state of the electronic parking brake, information on the position of the shift lever, and start-up on-off signal obtained by the detector 120.

For example, when the driving speed is not zero (e.g., greater than zero) when the start-on signal is received, the controller 140 may be configured to detect a driving state. When the driving speed is zero when the start-on signal is received, the controller 140 may be configured to detect a stopped state. When the information on the position of the shift lever is information corresponding to the parking, the controller 140 may be configured to detect a stopped state. When a start-off signal is received, the controller 140 may be configured to detect a parking state.

The controller 140 may be configured to determine whether an event has occurred based on the impact information detected by the impact detector, and in response to determining that the event has occurred, the controller 140 may be configured to store the event time information on the time of the event occurrence, and store identification information for the delta frame obtained at the time of event occurrence. In response to determining that the loudness of the sound detected by the sound detector is greater than a particular amount, the controller 140 may be configured to determine that a surrounding event has occurred and store event time information about the determined event occurrence time, and also may be configured to store identification information for delta frames obtained at the time of event occurrence.

The controller 140 may be configured to transmit event information on the occurrence of an event to the image processing apparatus 230. The controller 140 may be configured to operate the image processing apparatus 230 to compress and store the image obtained by the image acquisition device 130 based on the state information of the vehicle. The controller 140 may be configured to operate the image processing apparatus 230. Additionally, the controller 140 may also include a control device for operating a vehicle and an image processing apparatus 230, respectively. The controller 140 may be provided separately from the image processing apparatus 230. In particular, the controller 140 may be configured to communicate with the image processing apparatus 230.

This exemplary embodiment describes an example in which an image processing apparatus is provided in a controller. The image processing apparatus 230 may be configured to select a compression algorithm based on the received vehicle status information, controls compression of the image obtained by the image acquisition device 130 based on the selected compression algorithm, and store the compressed image information together with time information in the storage device 150. More specifically, when the vehicle is in a driving state, the image processing apparatus 230 may be configured to select a compression algorithm corresponding to the driving state and controls compression of the image obtained by the image acquisition device 130 using the selected compression algorithm.

When the vehicle is in a stopped state, the image processing apparatus 230 may be configured to select a compression algorithm corresponding to the stopped state and control compression of the image obtained by the image acquisition device 130 using the selected compression algorithm. When the vehicle is in a parked state, the image processing apparatus 230 may be configured to select a compression algorithm corresponding to the parking state and control compression of the image obtained by the image acquisition device 130 using the selected compression algorithm.

A compression algorithm corresponding to a driving state, a compression algorithm corresponding to a stopped state, and a compression algorithm corresponding to a parking state may be different from each other. The compression algorithm corresponding to the driving state and the compression algorithm corresponding to the stopped state may be identical to each other. The compression algorithm corresponding to the stopped state and the compression algorithm corresponding to the parking state may be identical to each other.

Figure 3:
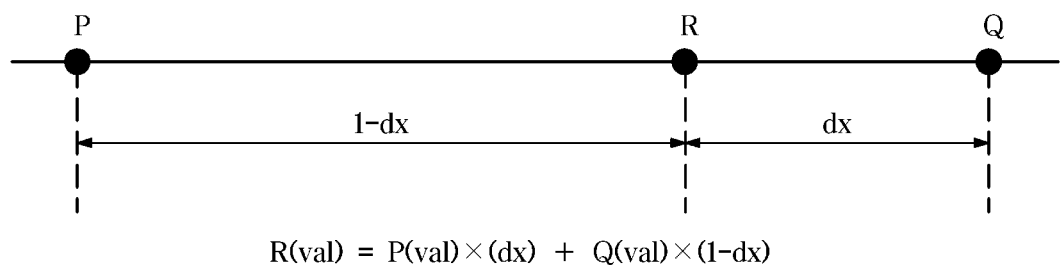
FIG. 3 is a diagram illustrating restoration of a key frame and a delta frame of the image processing apparatus shown in FIG. 1 according to another exemplary embodiment.

The image processing apparatus 230 may be configured to image-process the obtained image based on environmental information such as weather, time, and season before compressing the image. The image processing apparatus 230 may be configured to image-process the obtained image based on illumination information before compressing the image. When compressing the image obtained in the parking state, the operation of the image processing apparatus 230 will be described with reference to FIGS. 2A-2D and 3. FIGS. 2A-2D are exemplary diagrams illustrating acquisition of a key frame and a delta frame of the image processing apparatus shown in FIG. 1. FIG. 3 is a diagram illustrating restoration of a key frame and a delta frame of the image processing apparatus shown in FIG. 1.

When receiving an image from the image acquisition device 130, the image processing apparatus 230 may be configured to receive a preset number of frames during a reference time. In particular, the preset number may be 15, 24 or 30, which may be selected or changed by the vehicle manufacturer or user. For example, the image processing apparatus 230 may be configured to receive 15 frames per second, 24 frames per second, and 30 frames per second. In particular, each frame may be a still image of one scene. When the frames are received in real time, the image processing apparatus 230 may be configured to continuously compare frames by two frames in the order in which they are received.

When frames are received in real time, the image processing apparatus 230 may be configured to select two frames received at predetermined time interval and compare the two selected frames. For example, when the predetermined time is 2 seconds, the image processing apparatus 230 may be configured to compare the frame received at the time point 2 seconds ago and the frame received at the current time point, and compare a frame received at a current time point with a frame received at a time point 2 seconds later. The image processing apparatus 230 may be configured to compare two frames adjacent to each other among the received frames. For example, the image processing apparatus 230 may be configured to compare a frame received at a current time point with a frame received next.

Frames to be compared in this exemplary embodiment are described as first frame, second frame, third frame, and fourth frame according to time order. The first frame, second frame, third frame, and fourth frame may be original frames. The image processing apparatus 230 may be configured to compare the first frame and the second frame, confirm the same pixels (e.g., first pixels) between the first and second frames, confirms pixels (e.g., second pixels) that are different from pixels of the first frame among the pixels of the second frame, compress and store the confirmed first pixels, and compress and store the confirmed second pixels.

When compressing and storing the second pixels, the image processing apparatus 230 may be configured to compress and store the second pixels separately from the first pixels, but may also be configured to store time information about a time when the second frame is obtained. The first pixels may be pixels corresponding to a portion where no event occurs, and the second pixels may be pixels corresponding to a portion where an event occurs. The image processing apparatus 230 is a device configured to compress frames using a temporal compression algorithm when a vehicle is in a parked state. The image processing apparatus 230 may be configured to obtain and compress the frame including the first pixels as a key frame, and obtain and compress the frame including the second pixels as a delta frame. The image processing apparatus 230 may be configured to store time information at which the delta frame is obtained and position information on pixels constituting the delta frame together.

When the frames are received in real time, the image processing apparatus 230 may be configured to compare two frames in the order in which they are received, obtain a key frame and a delta frame based on the comparison result of the two frames, and execute compression and storage of the obtained key frame and delta frame. In other words, the image processing apparatus 230 may be configured to obtain one key frame and a plurality of delta frames by comparing a plurality of frames received in real time by two frames, and compress and store one obtained key frame and a plurality of delta frames. The image processing apparatus 230 may be configured to store time information at which each delta frame is obtained and position information about pixels constituting each delta frame together.

Referring to FIGS. 2A-2D, when a first frame P1, a second frame P2, a third frame P3, and a fourth frame P4 are received at a predetermined time interval, the image processing apparatus 230 may be configured to compare the first frame P1 and the second frame P2 to obtain a first key frame and a first delta frame Del1, compare the first frame P1 and the third frame P3 to obtain a second key frame and a second delta frame Del2, and compare the first frame P1 and the fourth frame P4 to obtain a third key frame and a third delta frame. When two frames are compared, if all pixels are the same, only a key frame may be obtained and a delta frame may not be obtained. In other words, when comparing the first frame P1 and the fourth frame P4, only the third key frame may be obtained.

Particularly, the first frame obtained initially may be a reference frame to be compared. The second key frame may be the same as or similar to the first key frame. The third key frame may be the same as or similar to the second key frame. The first delta frame may be different from the second delta frame. The image processing apparatus 230 may be configured to confirm the same pixels by comparing the first, second, and third key frames, and obtain the confirmed pixels as a final key frame. There may be one key frame for compression and storage, and there may be at least one or a plurality of delta frames.

The image processing apparatus 230 may be configured to obtain a final key frame composed of pixels excluding pixels corresponding to the first delta frame and pixels corresponding to the second delta frame among the pixels of the first frame, compress and store the obtained final key frame, compress and store a first delta frame, and compress and store a second delta frame. The first and second delta frames contain only information on pixels changed in the first key frame.

The image processing apparatus 230 may be configured to time information about a time when a second frame corresponding to a first delta frame is obtained, and position information about a pixel forming the first delta frame, and store time information about a time when a third frame corresponding to a second delta frame is obtained and position information about a pixel forming the second delta frame. In addition, when a first frame P1, a second frame P2, a third frame P3, and a fourth frame P4 are obtained at a predetermined time interval, the image processing apparatus 230 may be configured to compare the first frame P1 and the second frame P2 to obtain a first key frame and a first delta frame, compare the second frame P2 and the third frame P3 to obtain a second key frame and a second delta frame, and compare the third frame P3 and the fourth frame P4 to obtain a third key frame and a third delta frame.

The first key frame may include pixels excluding pixels corresponding to the first delta frame Del1 in the second frame P2. The second key frame may include pixels excluding pixels corresponding to the second delta frame Del2 and pixels corresponding to the first delta frame in the third frame P3. The third key frame may include pixels excluding pixels corresponding to the second delta frame Del2 in the fourth frame P4.

The second delta frame may include different pixels between the second frame and the third frame. The third delta frame may include different pixels between the third frame and the fourth frame. Referring to FIGS. 2A-2D as an example, the second delta frame may include Del1 pixels of the second frame P2, the third delta frame may include Del1 pixels of the second frame P2 and Del2 pixels of the third frame P3. The image processing apparatus 230 may be configured to compare a plurality of key frames and confirm all the same pixels between a plurality of key frames, obtain a final key frame using the confirmed same pixels, compress and store the obtained final key frame, and compress and store the first, second, and third delta frames, respectively.

When compressing a key frame, the image processing apparatus 230 may be configured to minimize pixels to a portion that may be restored by interpolation. In other words, the image processing apparatus 230 may be configured to compress the resolution of the key frame to a predetermined minimum resolution. When storing a plurality of delta frames, the image processing apparatus 230 may be configured to recognize an object in the plurality of delta frames, determine whether the recognized objects are the same, store any one of a plurality of delta frames having an image of the same object as a representative delta frame, confirm the acquisition time of the original frame corresponding to the representative delta frame and store time information regarding the confirmed time together.

When a display command by user input is received, the image processing apparatus 230 may be configured to restore a key frame and a plurality of delta frames, generate a single image by combining the restored key frame and a plurality of delta frames, and operate the display 112 to display the generated single image. In particular, the key frame may be the final key frame. The image processing apparatus 230 may be configured to determine a position at which each delta frame will overlap based on the position information for the pixel of the key frame and the position information for the pixel of each delta frame and overlap and display a plurality of delta frames within a key frame based on the determined position.

There may be one delta frame or a plurality of delta frames added to the key frame. When restoring a key frame and a plurality of delta frames, the image processing apparatus 230 may be configured to restore a key frame and a plurality of delta frames using an interpolation method. In particular, the interpolation method may be a linear interpolation method. Referring to FIG. 3, assuming that the pixel at point P and the pixel at point Q have linearity, the image processing apparatus 230 may be configured to obtain a pixel value of R based on a pixel value of P, a pixel value of Q and a distance ratio.

The image processing apparatus 230 may be configured to restore a key frame and a plurality of delta frames when a display command according to a user input is received, but select a representative delta frame from among a plurality of delta frames having an image for the same object, and display only the selected representative delta frame. The image processing apparatus 230 may be configured to confirm the representative delta frame based on the stored information and display the confirmed representative delta frame.

The image processing apparatus 230 may be configured to analyze the image-processed image to recognize objects such as other vehicles, pedestrians (e.g., people), animals, pillars, street trees, traffic lights, bicycles, motorcycles, and obtain information of the recognized objects. In particular, obtaining the information of the object may include obtaining the shape, size and the type of the object. The image processing apparatus 230 may also be configured to determine whether objects recognized in a plurality of delta frames are identical. The image processing apparatus 230 may be configured to select any one of delta frames having an image for the same object as a representative delta frame.

In particular, the representative delta frame may be a delta frame having an initial image of a recognized object or a delta frame having a last image of a recognized object. In addition, the representative delta frame may be a delta frame having a set number-th image of the recognized object.

When the display command is received, the image processing apparatus 230 may be configured to display the synthesized image, and may obtain time information for each representative delta frame and display the obtained time information together. Particularly, the representative time information for each delta frame may be time information on a time at which the original frame of each delta frame is obtained. The image processing apparatus 230 may be configured to display time information in a preset area.

When a selection signal and a playback command for any one time information selected by the user are received, the image processing apparatus 230 may be configured to confirm a representative delta frame having time information corresponding to the received selection signal, confirm a plurality of delta frames having the image of the same object as the image of the object in the representative delta frame and display the plurality of delta frames confirmed on the key frame. In other words, the image processing apparatus 230 may be configured to play an image of the same object as a moving image on a key frame.

When a selection signal for any one time information selected by the user is received, the image processing apparatus 230 may be configured to confirm the representative delta frame having time information corresponding to the received selection signal, and display only the confirmed representative delta frame together with the key frame, but may allow the confirmed representative delta frame to be displayed to be highlighted more than the remaining representative delta frames. For example, the image processing apparatus 230 may be configured to delete the remaining representative delta frames so that they are not displayed on the key frame and only the confirmed representative delta frames are displayed.

As another example, the image processing apparatus 230 may be configured to display an image that is darker than the remaining representative delta frames to highlight the confirmed representative delta frame. As another example, the image processing apparatus 230 may be configured to display an emphasis line on the border of the confirmed representative delta frame, or change and display the color of the confirmed representative delta frame.

The image processing apparatus 230 may be configured to confirm a representative delta frame having time information corresponding to the received selection signal, when some of the confirmed representative delta frame pixels are the same as the remaining representative delta frame pixels, cause the confirmed representative delta frame to be displayed in front of the remaining representative delta frames. Displaying confirmed representative delta frame in front of the remaining representative delta frames may include displaying all the pixels of the confirmed representative delta frame.

The image processing apparatus 230 may be configured to change the key frame when the number of first pixels of the key frame is less than the reference number, and obtain the delta frame again from the time when the key frame is changed. When obtaining a key frame and a delta frame, the image processing apparatus 230 may be configured to adjust the brightness of the obtained frame based on at least one of weather, time, season, and illuminance, and obtain the key frame and delta frame based on the adjusted brightness.

The image processing apparatus 230 may be configured to delete key frames and delta frames whose storage time has passed the reference time. The image processing apparatus 230 may be configured to confirm the storage space of the storage device 150, and in response to determining that the storage space of the storage device 150 is insufficient, the image processing apparatus 230 may be configured to secure a storage space of the storage device 150 by deleting the key frame and the delta frame having the oldest storage period.

When a playback command is received while a plurality of delta frames are stored, the image processing apparatus 230 may be configured to restore the stored key frame and the plurality of delta frames, respectively, and simultaneously play the restored plurality of delta frames in the restored key frame. In particular, the plurality of delta frames may include pixels obtained from images obtained by the image acquisition device at the same time, and may include pixels obtained from images obtained by the image acquisition device at different times.

The image processing apparatus 230 may be configured to simultaneously play the restored plurality of delta frames, and confirm the first delta frame obtained at a first time point before a first predetermined time from the time point at which the event information is received among the plurality of delta frames, confirm the second delta frame obtained at a second time point after a second predetermined time from the time point at which the event information is received, execute simultaneous playback of the first delta frame and the second delta frame obtained during a time between the first time point and the second time point. The image processing apparatus 230 may be implemented as a memory storing an algorithm for controlling image processing, compression, restoration, display, reproduction, and storage, or a data about a program that reproduces the algorithm, and as a processor (not shown) that performs the above-described operation using data stored in the memory. In particular, the memory and the processor may be implemented as separate chips, respectively. Alternatively, the memory and processor may be implemented as a single chip.

The storage device 150 may be configured to store images (frames) processed by the image processing apparatus 230. The storage device 150 may be configured to store time information corresponding to the delta frame and position information of the pixels of the delta frame. The image stored in the storage device 150 may be an image in a still state. In addition, images stored in the storage device 150 may be classified and stored for each key frame, date and time. The storage device 150 may be configured to delete the stored image according to a control command of the image processing apparatus 230 or the controller 140. The storage device 150 may be configured to store an image storage period for permanently deleting the stored image. The storage device 150 may be electrically connected to the controller 140 and the image processing apparatus 230. The storage device 150 may be provided to be detachable and portable from a vehicle. The storage device 150 may be provided to be electrically, communicatively, and mechanically connected to an external device.

The vehicle may further include a separate storage (not shown) configured to store basic data for image processing by the image processing apparatus, control data for operation control, and input/output data. Such a storage may be configured to store various data for the overall operation of the vehicle 1, such as a program for processing or controlling of the controller 140. This storage may be a memory implemented as a separate chip from the processor described above with respect to the controller 140, or may be implemented as a single chip with the processor.

The storage may be implemented with at least one of a non-volatile memory device, such as a cache, Read Only Memory (ROM), Programmable ROM (PROM), Erasable Programmable ROM (EPROM), and Electrically Erasable Programmable ROM (EEPROM), a volatile memory device, such as Random Access Memory (RAM), or a storage medium, such as Hard Disk Drive (HDD) and Compact Disk (CD) ROM, without being limited thereto.

The transceiver 160 may be configured to perform communication between various electronic devices in the vehicle, communication with the external device, communication with the user terminal, and communication with a storage medium. The transceiver 160 may include one or more components that enable communication with the controller 140, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module. The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The vehicle may further include a sound input device 170 configured to receive sound from the user and surroundings, and a sound output device 180 configured to output sound of an image displayed on the display 112. The sound input device 170 may include at least one microphone or a microphone array. The sound output device 180 may include a speaker. The speaker may be configured to convert the amplified low-frequency audio signal into an original sound wave, generate a small wave in the air, and radiate the sound wave, thereby outputting the audio data as sound that the user may hear.

At least one component may be added or deleted corresponding to the performance of the components of the vehicle shown in FIG. 1. In addition, it will be readily understood by those of ordinary skill in the art that the mutual positions of the components may be changed corresponding to the performance or structure of the system.

Figure 4:
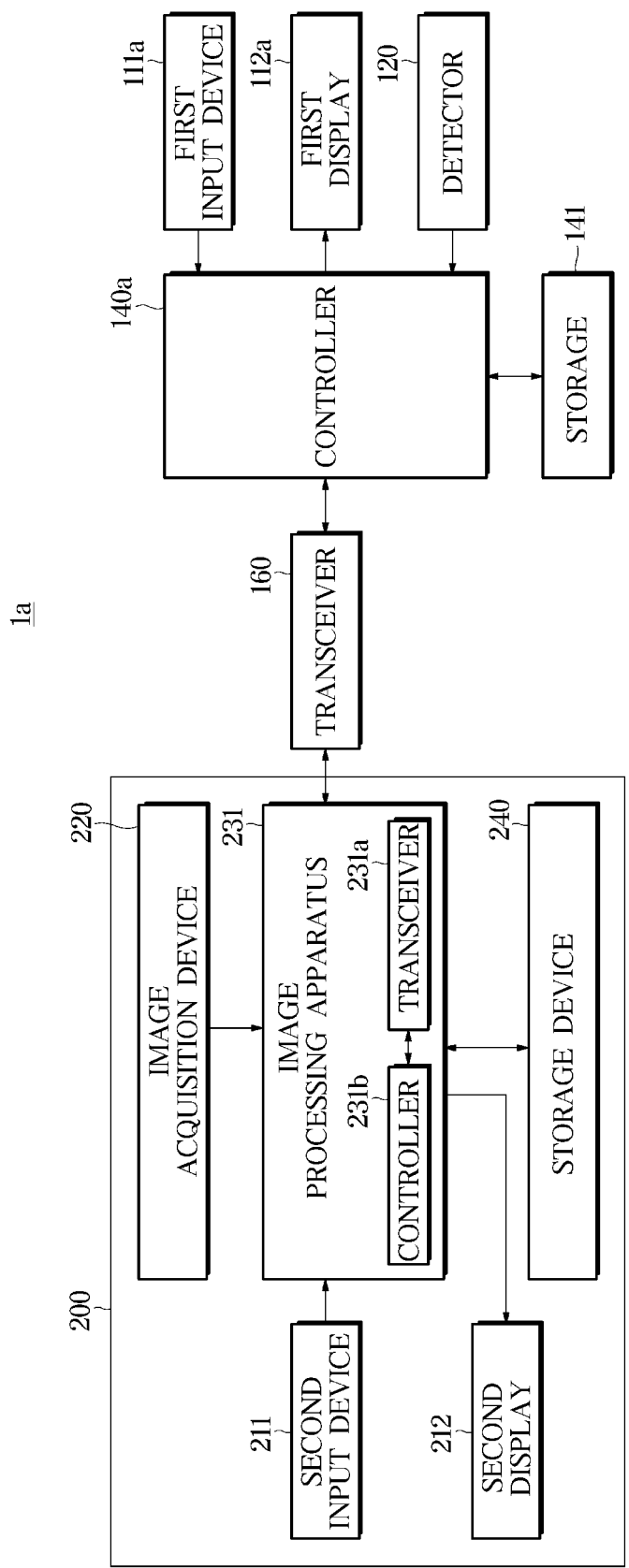
FIG. 4 is a control configuration diagram of a vehicle including an image processing apparatus according to another exemplary embodiment.
Figure 6A:
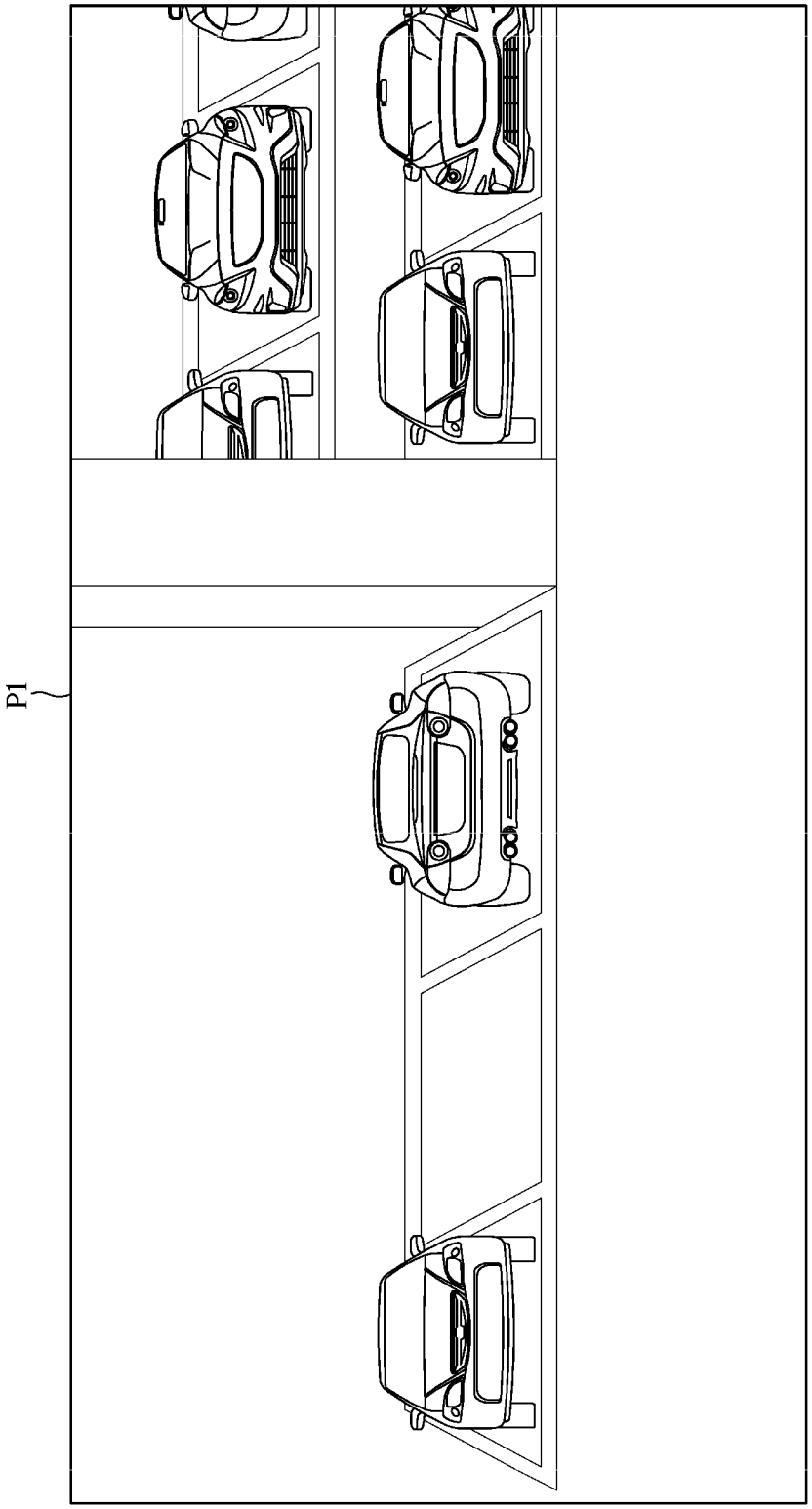
FIGS. 6A, 6B, 6C, 6D, 6E, and 6F are exemplary views of frames received by the image processing apparatus according to another exemplary embodiment.
Figure 6B:
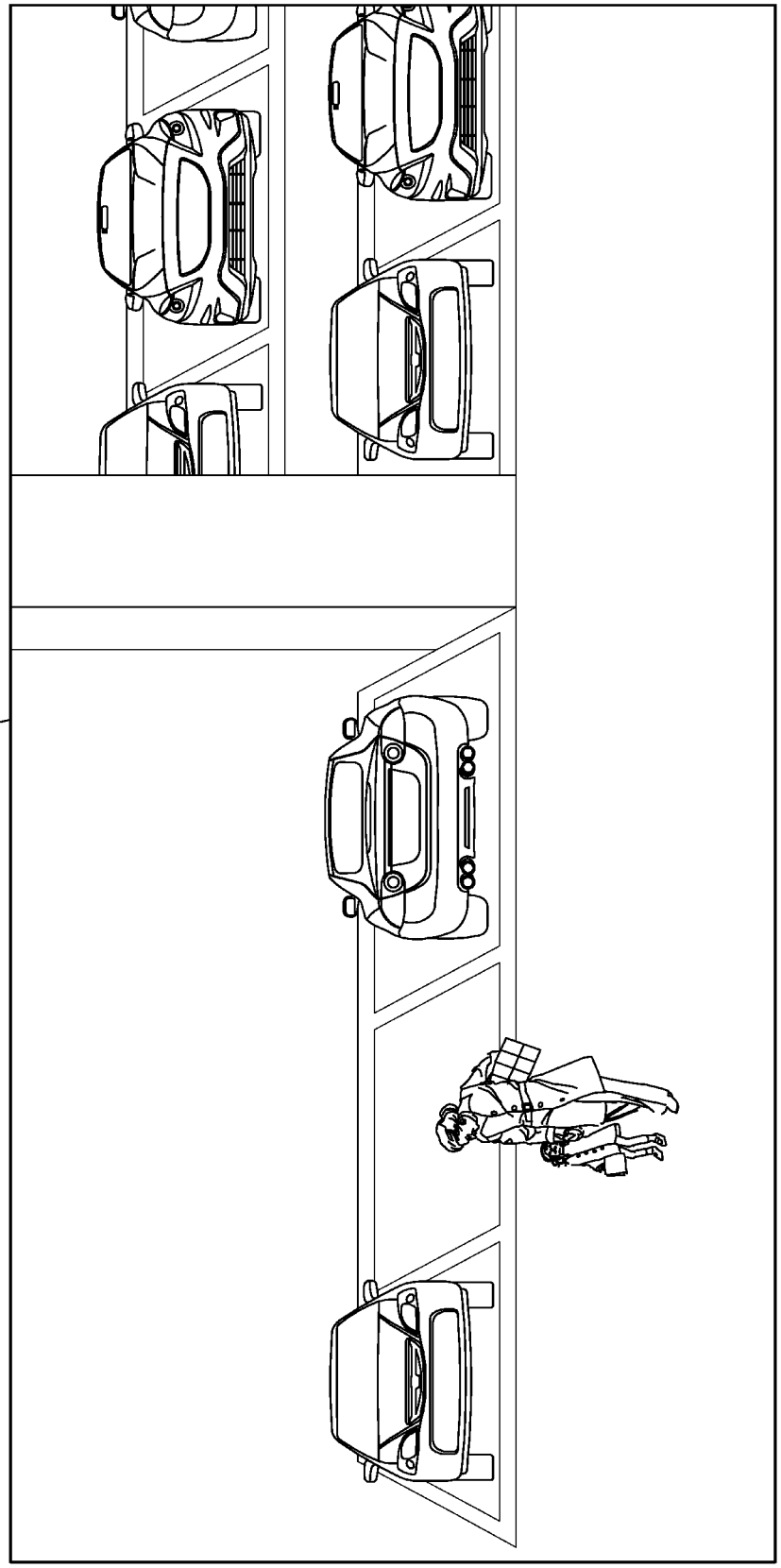
Figure 6C:
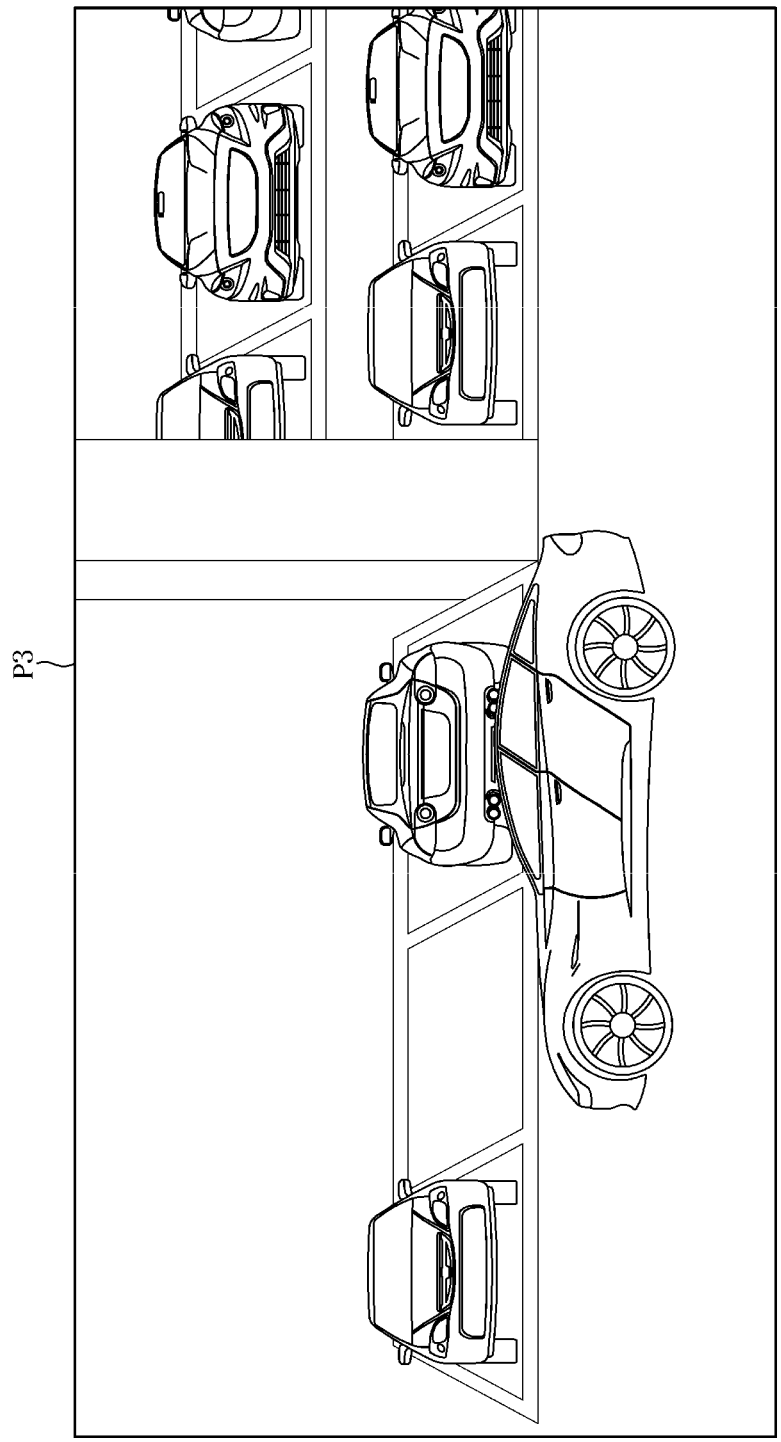
Figure 6D:
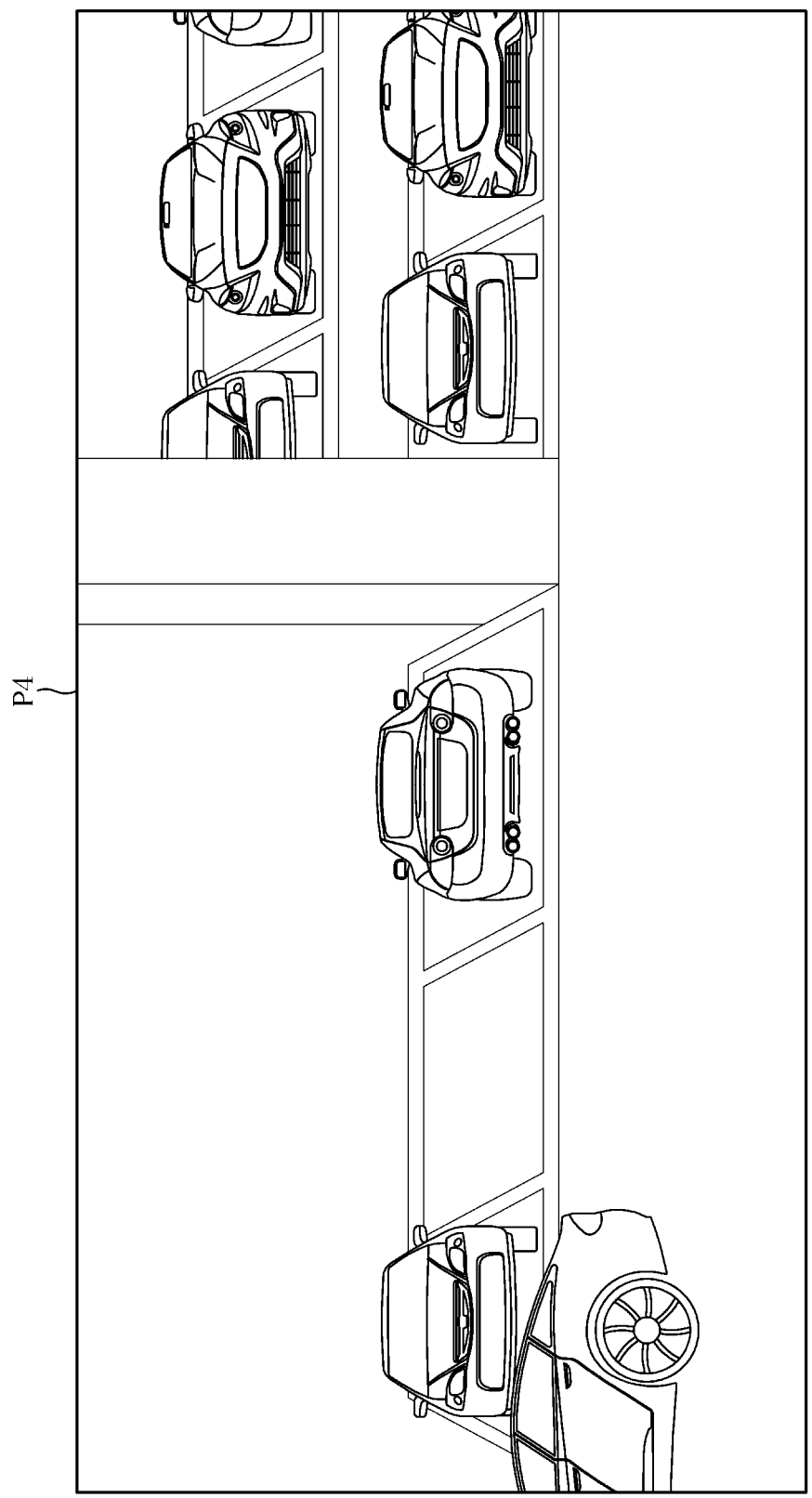
Figure 6E:
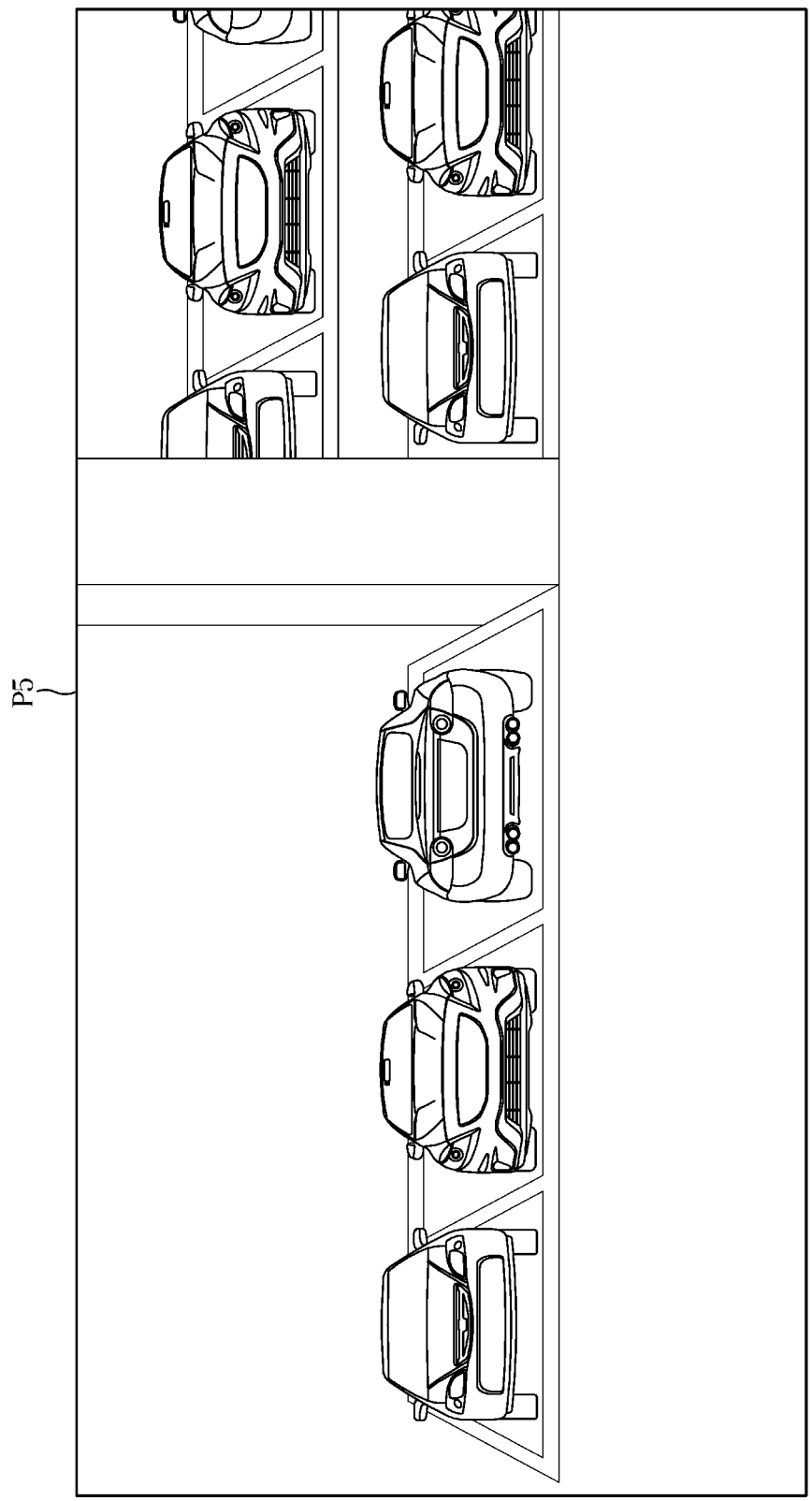
Figure 6F:
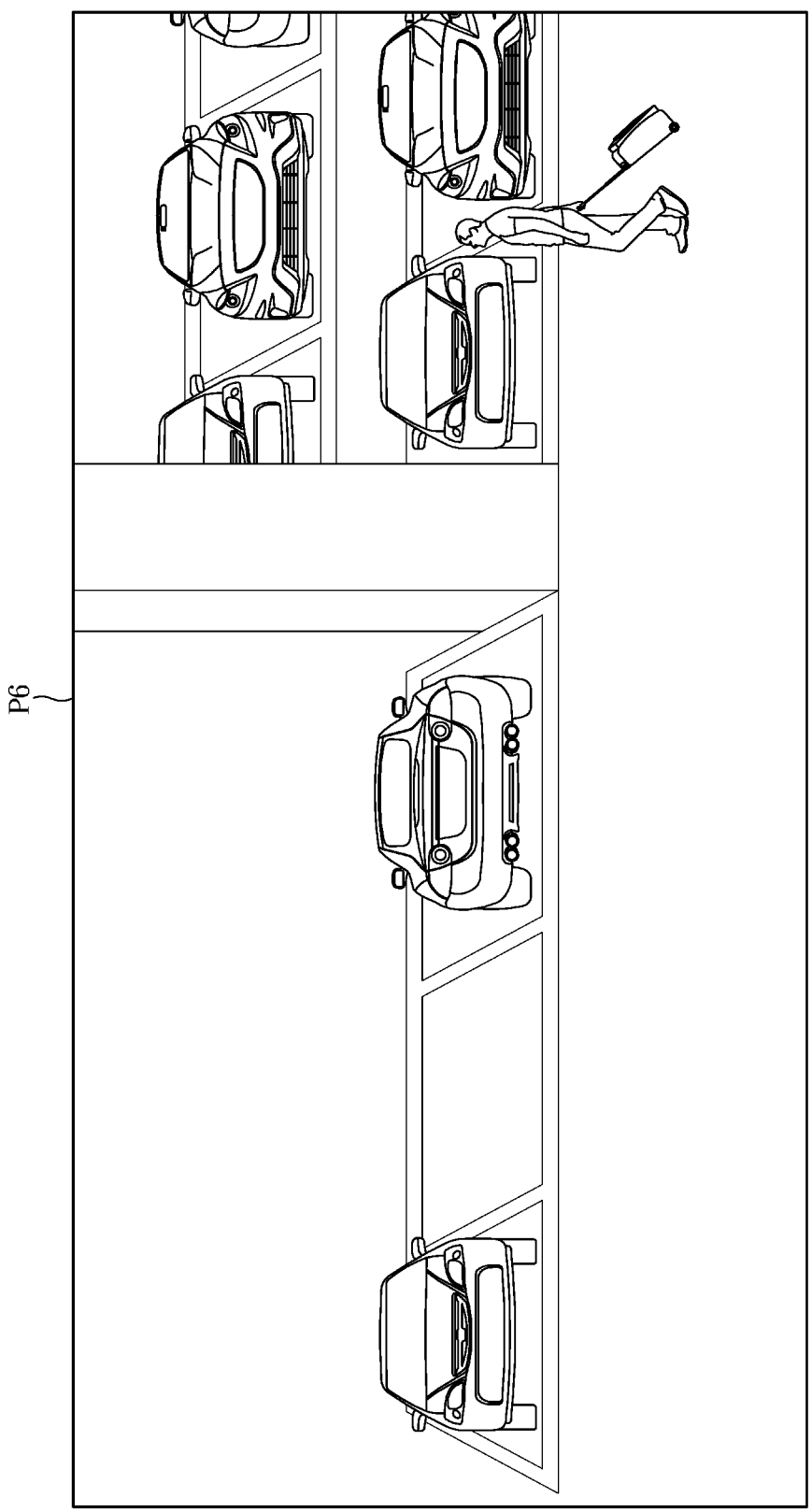

FIG. 4 is a control configuration diagram of a vehicle including an image processing apparatus according to another exemplary embodiment. The control configuration diagram of the vehicle illustrated in FIG. 4 may be a modified example of the control configuration diagram of the vehicle illustrated in FIG. 1. A vehicle 1a according to another exemplary embodiment may include a first input device 111a, a first display 112a, a detector 120, a controller 140a, a storage 141 and a transceiver 160, and may further include a black box 200.

In particular, the first input device 111a, the first display 112a, the detector 120, the storage 141 and the transceiver 160 are the same as the input device 111, the display 112, the detector 120, the storage (not shown) and the transceiver 160 according to an exemplary embodiment, and a description thereof is therefore omitted. The controller 140a of the vehicle according to another exemplary embodiment may be configured to obtain the state information of the vehicle in the same manner as the controller 140 according to an exemplary embodiment.

The controller 140a of the vehicle according to another exemplary embodiment may be configured to operate the transceiver 160 to enable communication with the black box 200. The black box 200 may be electrically, mechanically and communicatively connected to the vehicle 1a, and may be installed in the vehicle 1a to be electrically, mechanically and communicatively detachable. The black box 200 may include a second input device 211, a second display 212, an image acquisition device 220, an image processing apparatus 231, and a storage device 240.

The second input device 211 may be configured to receive a user input and receive a power on/off command, a parking mode on/off command for obtaining an image during parking, a display command, a playback command, a stop command, a pause command, a time information selection command, and the like. The second display 212 may be configured to display or play an image stored in the storage device 240. The second display 212 may be configured to display an image (e.g., a delta frame) having time information selected by the user. Additionally, the second display 212 may be configured to display an image having date information selected by the user and an image having time information selected by the user.

The image acquisition device 220 may be configured to obtain an image around the vehicle. The image acquisition device 220 may include a camera. In the parking mode, the image acquisition device 220 may be configured to receive power from a battery provided in the vehicle and obtain an image around the vehicle. In particular, the images around the vehicle may be images in the front and left and right directions of the vehicle. The image processing apparatus 231 may include a transceiver 231a configured to perform communication with a vehicle, and a controller 231b configured to execute compression and storage of frames.

The transceiver 231a may be configured to execute communication between the image acquisition device and the controller 231b, execute communication between the storage device and the controller 231b, execute communication between the second display and the controller 231b, and execute communication between the second input device and the controller 231b. The configuration of the controller 231b of the image processing apparatus 231 is the same as the configuration of the image processing apparatus 230 according to an exemplary embodiment, and a description thereof will be omitted. The storage device 240 is the same as the storage device 150 according to an exemplary embodiment, and a description thereof is omitted.

FIG. 5 is a control flow chart of an image processing apparatus in a vehicle according to an exemplary embodiment, and is a flowchart of a method of storing an image obtained through an image acquisition device. This will be described with reference to FIGS. 6A to 13. In response to determining that the vehicle is in a parking state (301), the image processing apparatus may be configured to activate the operation of the image acquisition device, and obtain an image around the vehicle in real time through the activated image acquisition device 130 (302).

The determining of the vehicle in the parked state may include receiving a parking signal for the parking state from the vehicle, and receiving a start-off signal from the vehicle. The image processing apparatus may be configured to tune the brightness, sharpness, and color of the image and remove noise by image processing an image obtained based on at least one of weather, time, illuminance, and season.

The vehicle may be configured to receive environmental information about the weather or season from the server, and transmit the received environmental information to the image processing apparatus. In other words, the image processing apparatus may be configured to receive environmental information about the weather or season from the vehicle. The vehicle may have a timer function, and may further include an illuminance detector configured to detect illuminance. In particular, the image processing apparatus may also be configured to receive environmental information about time and illuminance from the vehicle.

In addition, the image processing apparatus may have a timer function, and may further include an illuminance detector. The image processing apparatus may be configured to obtain tuning information corresponding to environmental information stored in a storage, and tune brightness, sharpness, color, etc. of an obtained image based on the obtained tuning information. The image processing apparatus may be configured to receive an image obtained in real time by an image acquisition device in units of frame.

As shown in FIGS. 6A to 6F, the image processing apparatus may be configured to receive a first frame P1, a second frame P2, a third frame P3, a fourth frame P4, a fifth frame P5, and a sixth frame P6 in chronological order. The first frame P1, the second frame P2, the third frame P3, the fourth frame P4, the fifth frame P5, and the sixth frame P6 may be original frames. In particular, the first frame obtained first while the image acquisition device is activated may be a reference frame. The reference frame may be a frame that is a basis for obtaining a key frame.

The image processing apparatus may be configured to confirm time information on the acquisition times of the first frame P1, second frame P2, third frame P3, fourth frame P4, fifth frame P5 and sixth frame P6 and store the confirmed time information. The image processing apparatus may be configured to compare the first frame P1 and the second frame P2, confirm the same pixels (e.g., first pixels) between the first and second frames, and confirms pixels (e.g., second pixels) that are different from pixels of the first frame among the pixels of the second frame. In particular, the image processing apparatus may be configured to obtain a frame including the first pixels as a first key frame, and obtain a frame including the second pixels as a first delta frame (303).

The image processing apparatus may be configured to compare the first frame P1 and the third frame P3, confirm the same pixels (e.g., third pixels) between the first and third frames, and confirm pixels (e.g., fourth pixels) that are different from pixels of the first frame among the pixels of the third frame. In particular, the image processing apparatus may be configured to obtain a frame including the third pixels as a second key frame, and obtain a frame including the fourth pixels as a second delta frame.

The image processing apparatus may be configured to compare the first frame P1 and the fourth frame P4, confirm the same pixels (e.g., fifth pixels) between the first and fourth frames, and confirm pixels (e.g., sixth pixels) that are different from pixels of the first frame among the pixels of the fourth frame. In particular, the image processing apparatus may be configured to obtain a frame including the fifth pixels as a third key frame, and obtain a frame including the sixth pixels as a third delta frame.

The image processing apparatus may be configured to compare the first frame P1 and the fifth frame P5, confirm the same pixels (e.g., seventh pixels) between the first and fifth frames, and confirm pixels (e.g., eighth pixels) that are different from pixels of the first frame among the pixels of the seventh frame. In particular, the image processing apparatus may be configured to obtain a frame including the seventh pixels as a fourth key frame, and obtain a frame including the eighth pixels as a fourth delta frame.

The image processing apparatus may be configured to compare the first frame P1 and the sixth frame P6, confirm the same pixels (e.g., ninth pixels) between the first and sixth frames, and confirm pixels (e.g., tenth pixels) that are different from pixels of the first frame among the pixels of the ninth frame. In particular, the image processing apparatus may be configured to obtain a frame including the ninth pixels as a fifth key frame, and obtain a frame including the tenth pixels as a fifth delta frame. The image processing apparatus may be configured to compare the 1st, 2nd, 3rd, 4th and 5th key frames to confirm the same pixels between the 1st, 2nd, 3rd, 4th, 5th key frames, obtain a final key frame including the confirmed same pixels, and compress and store the obtained final key frame.

Figure 7:
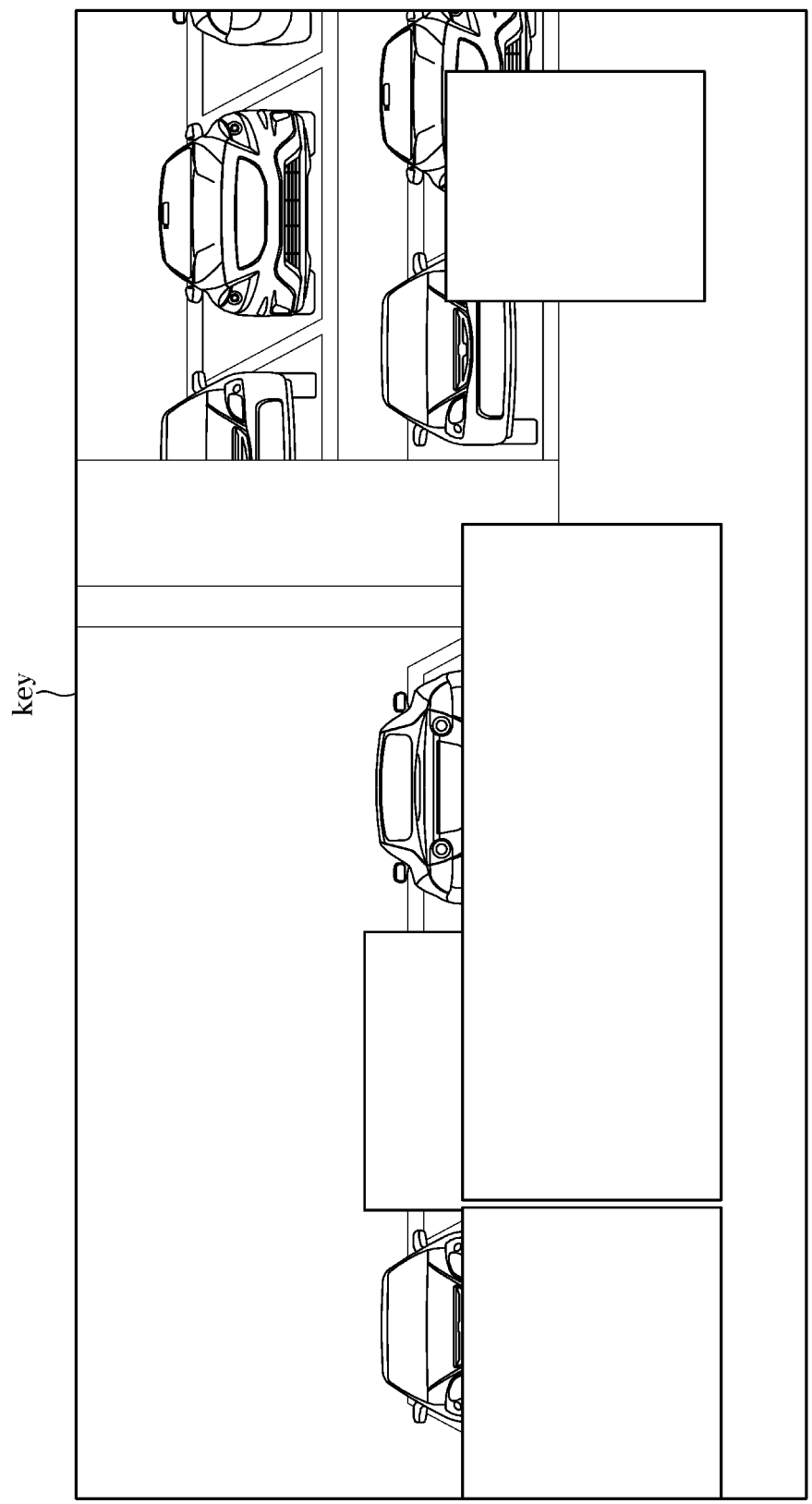
FIG. 7 is an exemplary diagram of a key frame image-processed by an image processing apparatus according to another exemplary embodiment.
Figure 8A:
FIGS. 8A-8E are exemplary diagrams of a representative delta frame image-processed by an image processing apparatus according to another exemplary embodiment.
Figure 8B:
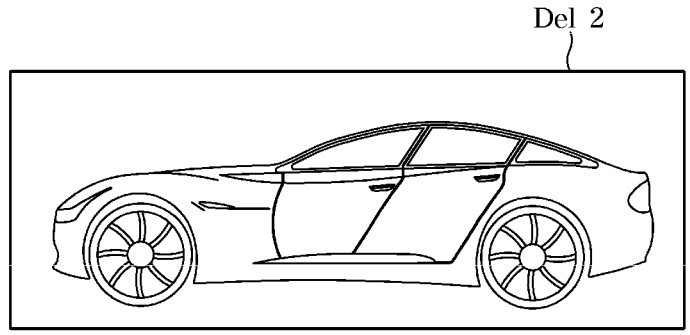
Figure 8C:
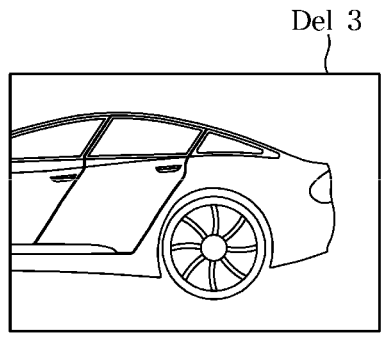
Figure 8D:
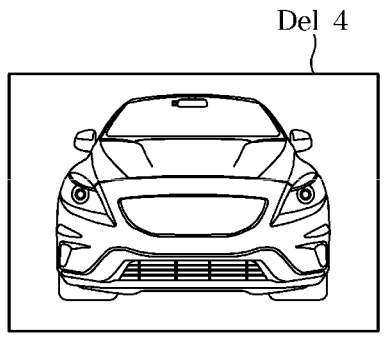
Figure 8E:
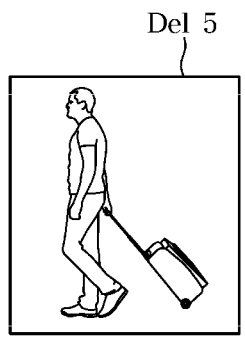

As shown in FIG. 7, it may be possible to obtain a final key frame (Key) composed of the same pixel between the first, second, third, fourth, and fifth key frames. The image processing apparatus may be configured to obtain a plurality of delta frames, and compress and store the obtained plurality of delta frames (304). The image processing apparatus may be configured to analyze a plurality of delta frames to detect objects such as other vehicles, pedestrians (e.g., people), animals, pillars, street trees, traffic lights, bicycles, motorcycles in each delta frame, and obtain information of the recognized objects. In particular, obtaining the information of the object may include obtaining the shape, size and the type of the object.

The image processing apparatus may also be configured to determine whether objects recognized in a plurality of delta frames are identical. The image processing apparatus may be configured to select any one of delta frames having an image for the same object as a representative delta frame and may also store information on the selected representative delta frame. The information on the representative delta frame may be the number or identification information (ID) of the delta frame.

As shown in FIGS. 8A-8E, the image processing apparatus may be configured to obtain a first representative delta frame Del1, a second representative delta frame Del2, a third representative delta frame Del3, a fourth representative delta frame Del4, and a fifth representative delta frame Del5, and compress and store a plurality of the obtained representative delta frames. When the display command input through the input device 111 is received (305), the image processing apparatus may be configured to restore a key frame and a plurality of delta frames stored in the storage device 150 (306), and synthesize the restored key frame and a plurality of delta frames (307). In particular, restoring a key frame and a plurality of delta frames may include restoring a key frame and a plurality of delta frames using a linear interpolation method.

Synthesizing a key frame and a plurality of delta frames may include overlapping a plurality of delta frames within a key frame based on position information for a pixel of the key frame and position information for a pixel of each delta frame. Additionally, synthesizing a plurality of delta frames may include confirming a representative delta frame for each of the plurality of delta frames and overlapping each confirmed representative delta frame on a key frame.

Figure 9:
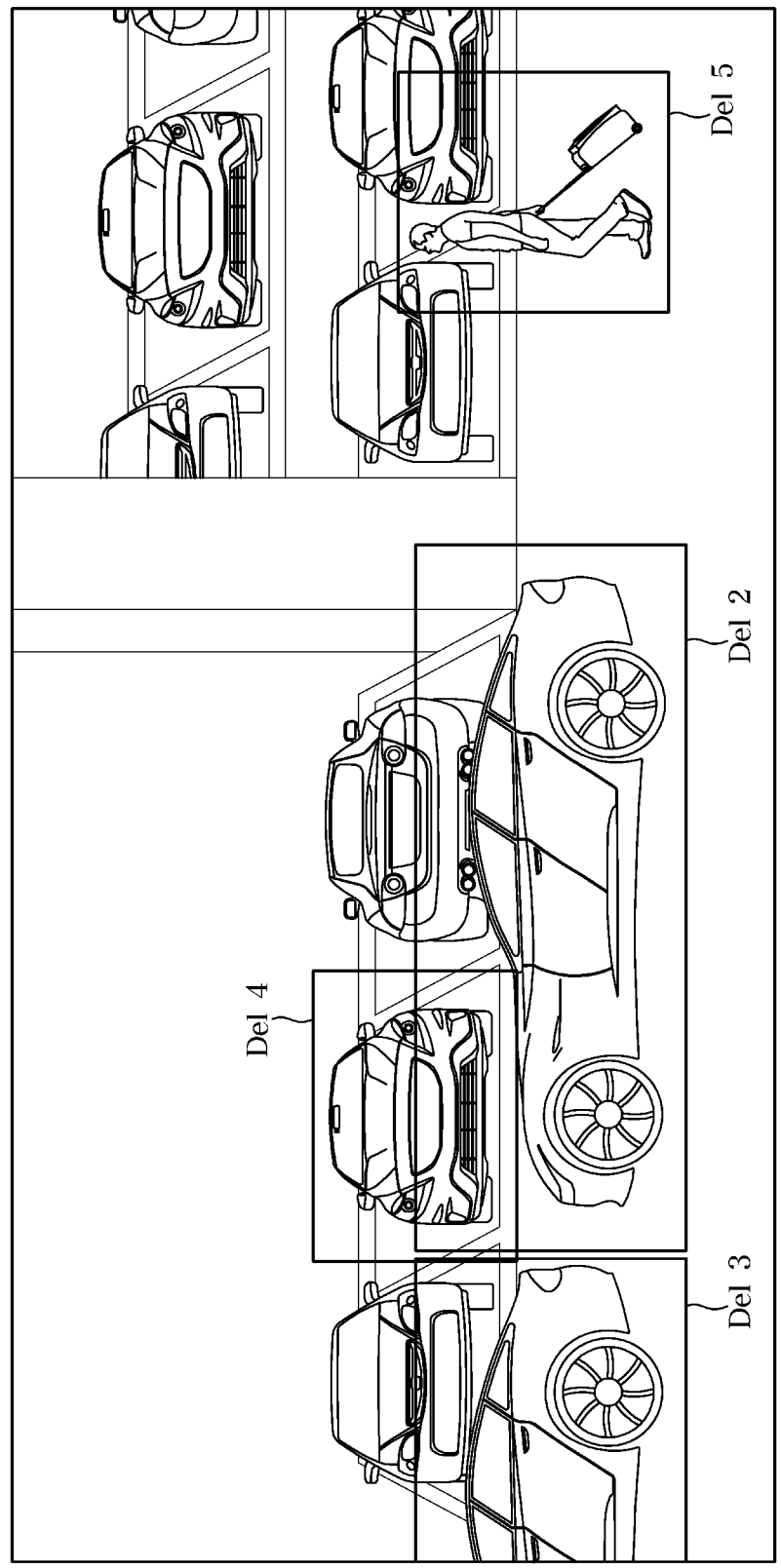
FIGS. 9 to 13 are exemplary diagrams for displaying images image-processed by an image processing apparatus according to another exemplary embodiment.

As shown in FIG. 9, the image processing apparatus may be configured to display a key frame and a plurality of representative delta frames on the display 112, but display by overlapping them with key frame based on position information of a pixel constituting each representative delta frame. The image processing apparatus may be configured to confirm time information corresponding to each of the representative delta frames and display the confirmed time information in a preset area of the display.

Figure 10:
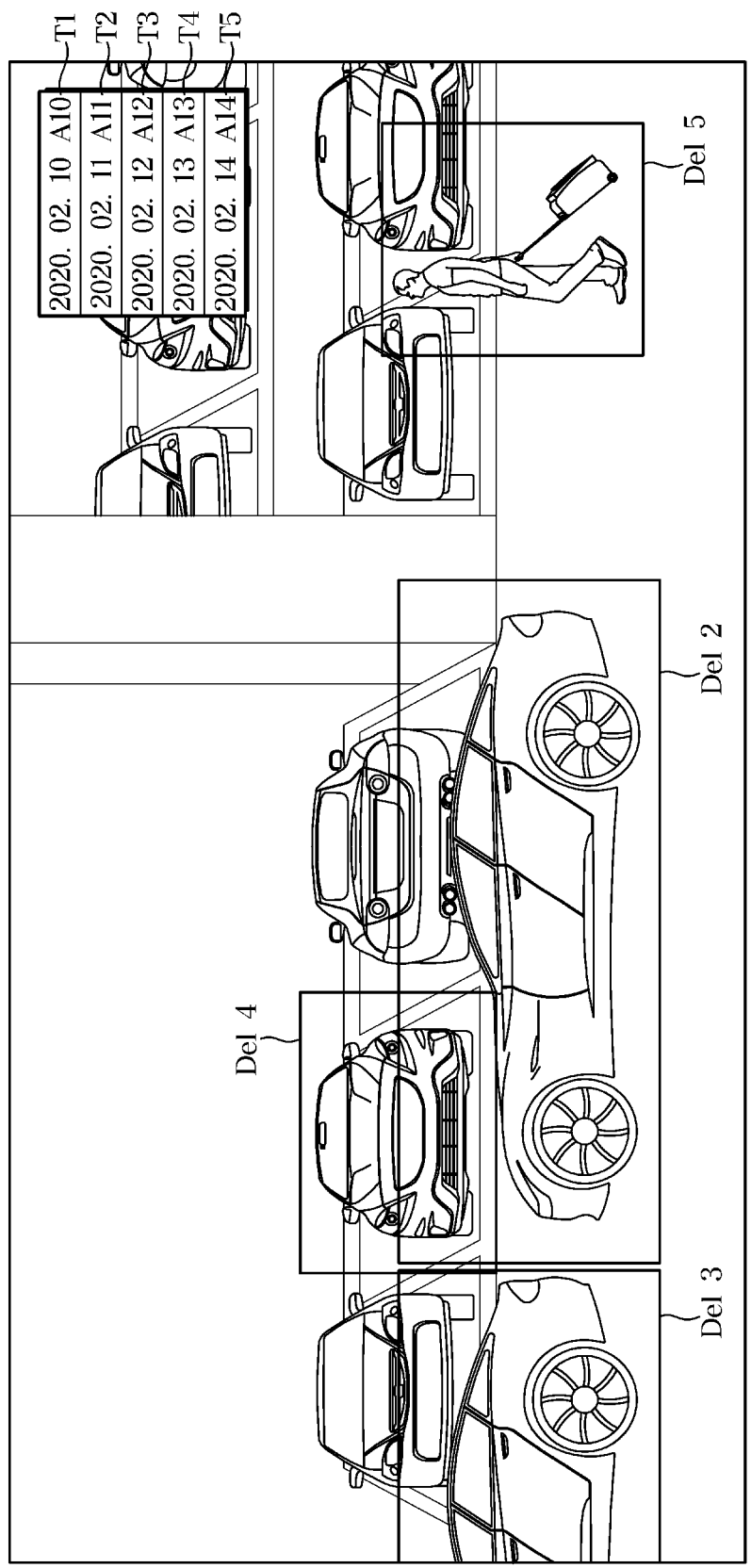

As shown in FIG. 10, the image processing apparatus may be configured to display a key frame and a plurality of representative delta frames on the display 112, but display 308 time information (T1 to T5) corresponding to each of the representative delta frame together. When a selection signal for any one time information selected by the user is received (309), the image processing apparatus 230 may be configured to confirm the representative delta frame having time information corresponding to the received selection signal, and display only the confirmed representative delta frame together with the key frame, but may allow the confirmed representative delta frame to be displayed to be highlighted than the remaining representative delta frames (310).

Figure 11:
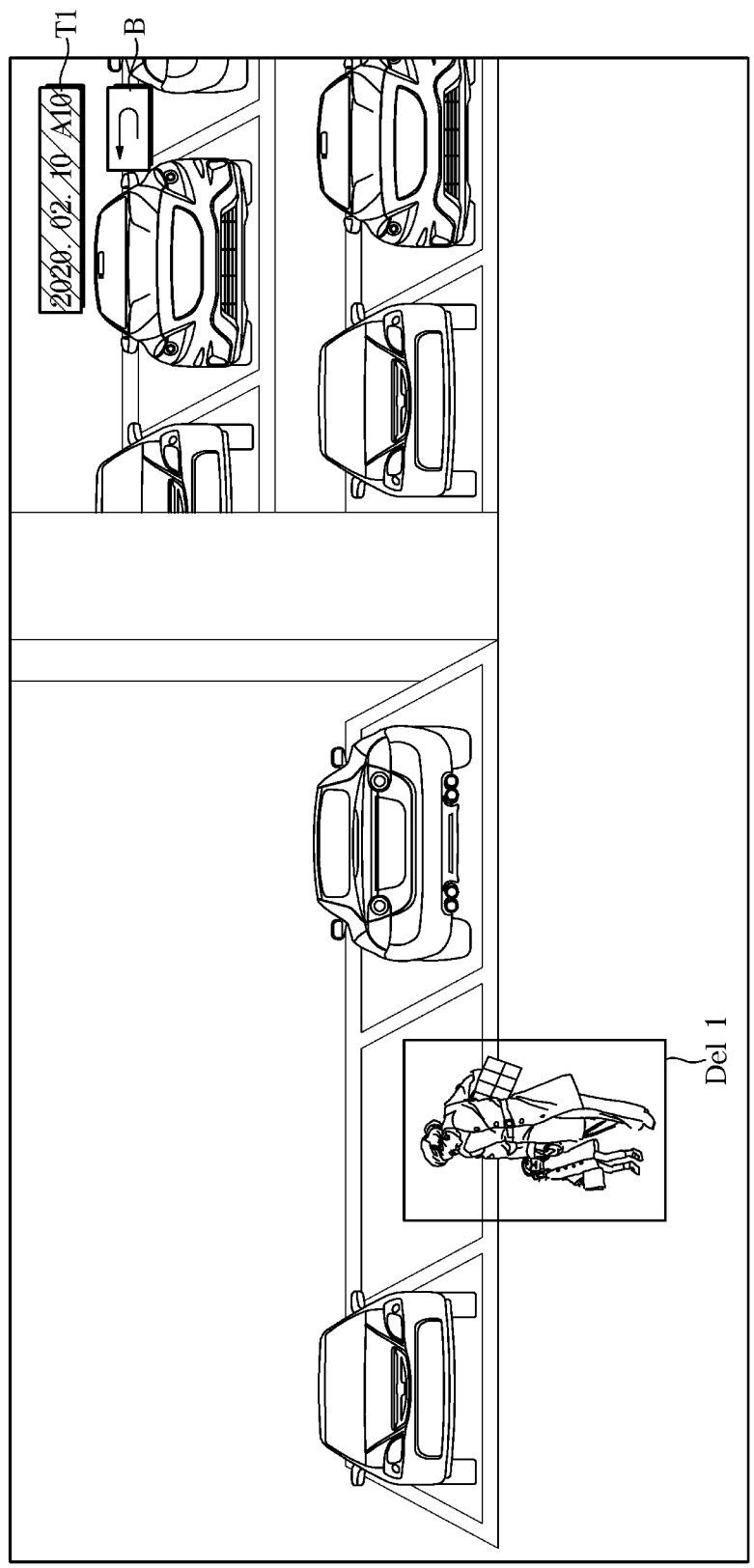

As shown in FIG. 11, when the selection signal of the first time information T1 is received, the image processing apparatus may be configured to confirm the first representative delta frame Del1 having the first time information T1, display only the confirmed first representative delta frame Del1 on the display 111, and prevent display of the remaining representative delta frames, the second to fifth delta frames. The image processing apparatus may further be configured to display a previous button B for displaying all time information.

When the selection signal of the first time information T1 is received, the image processing apparatus may be configured to confirm a first representative delta frame Del1 having first time information T1, obtain all delta frames having an image of the same object as the object in the confirmed first representative delta frame Del1, and display an image of an object in the first representative delta frame Del1 using the first representative delta frame and the obtained delta frame. In particular, the image of the object in the first representative delta frame Del1 may be a moving image.

Figure 12:
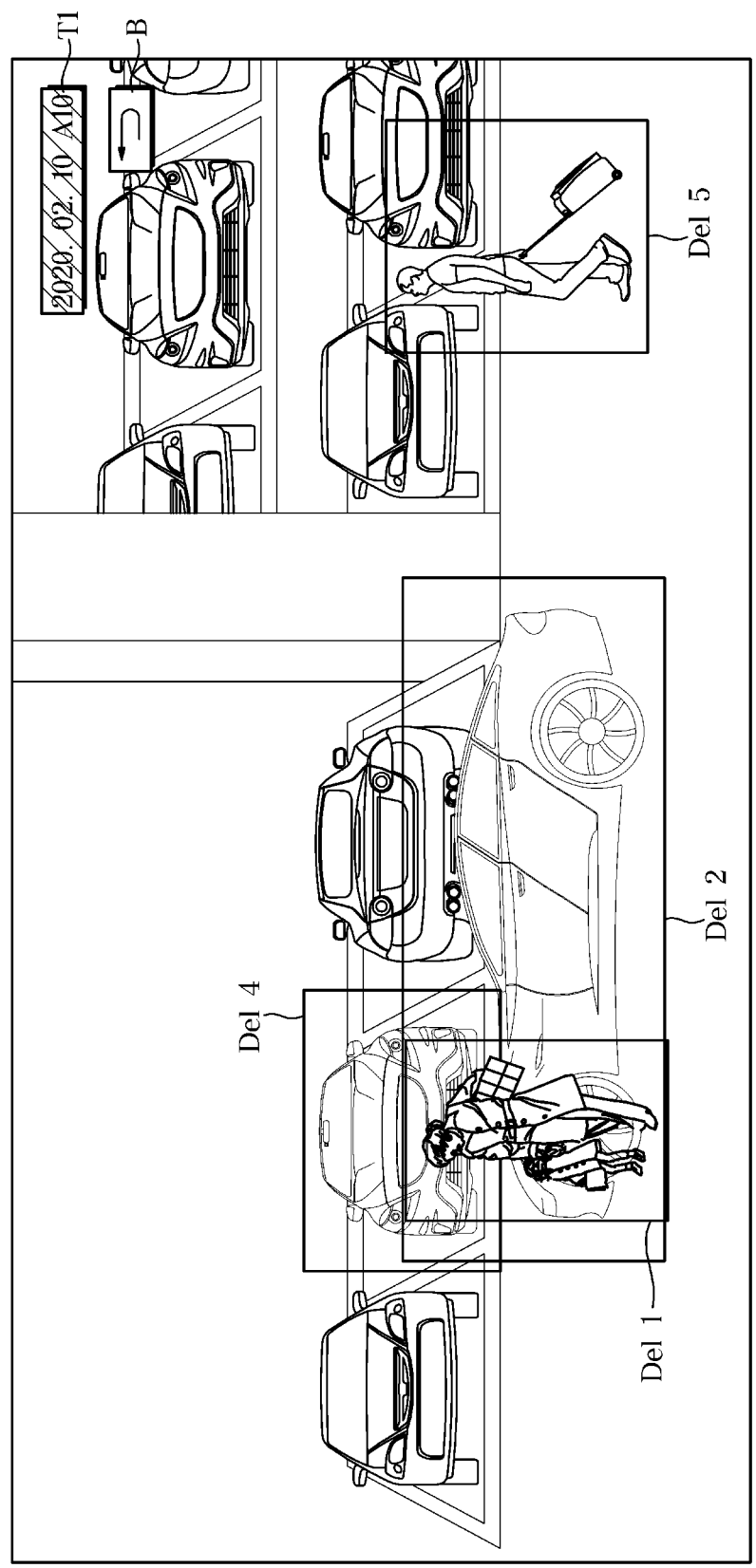

As shown in FIG. 12, when the selection signal of the first time information T1 and the fifth time information T5 is received, the image processing apparatus may be configured to confirm a first representative delta frame Del1 having first time information T1 and a fifth representative delta frame Del5 having fifth time information T5, and overlap and display only the confirmed first and fifth representative delta frames Del1, Del5 on the key frame. The image processing apparatus may be configured to make the selected time information have color information different from the unselected time information. In other words, selected time information and unselected time information may be displayed differently on the display.

In addition, the image processing apparatus 230 may be configured to simultaneously display a plurality of restored delta frames, and confirm the first delta frame obtained at the time event information is received among the plurality of delta frames, when partial areas of the first delta frame overlap with partial areas of the second delta frame of some of the remaining delta frames, may be configured to adjust the entire area of the first delta frame to be displayed. In particular, the image processing apparatus 230 may be configured to control non-display of a partial area of the second delta frame overlapped with a partial area of the first delta frame.

Figure 13:
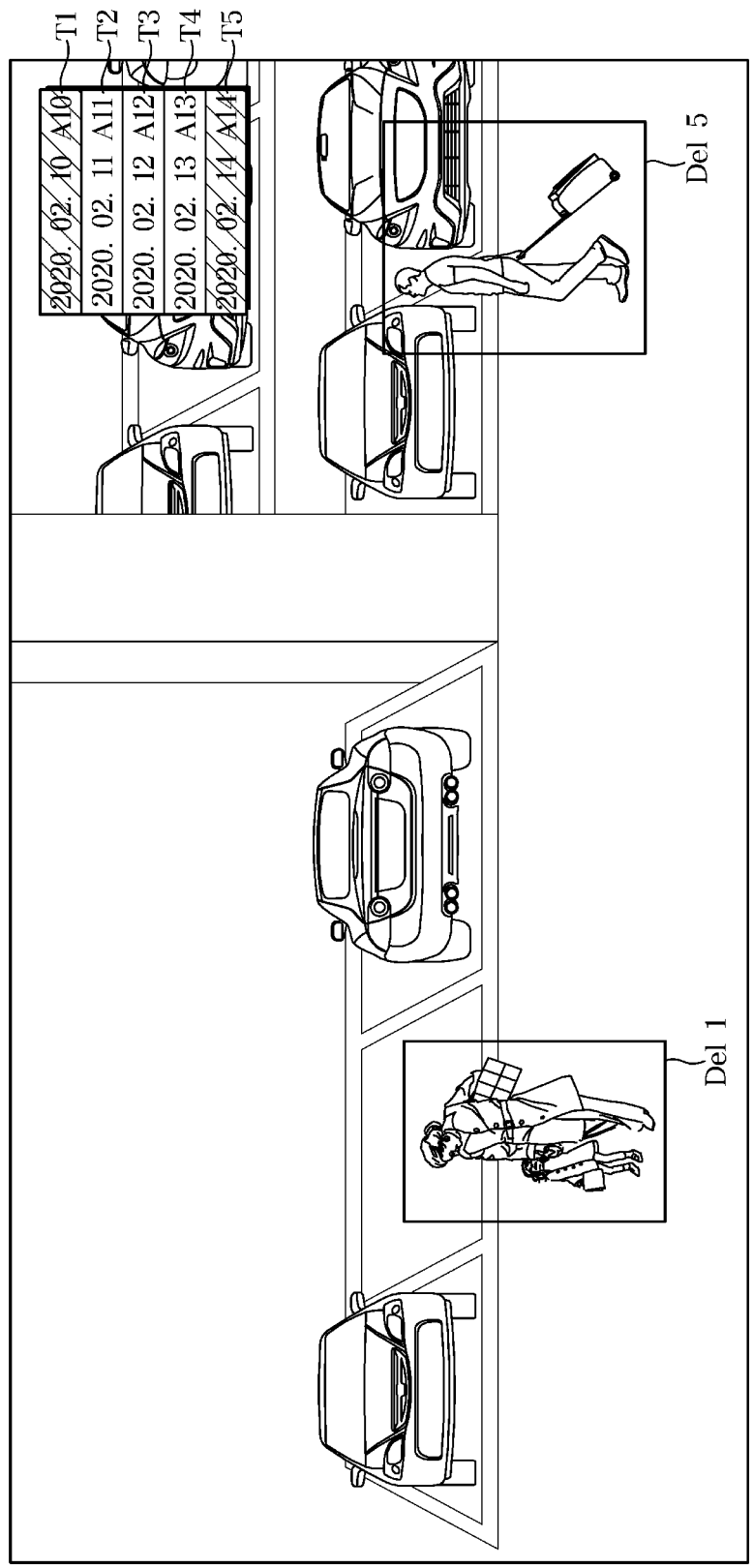

As shown in FIG. 13, when the selection signal of the first time information T1 is received, the image processing apparatus may be configured to confirm the first representative delta frame Del1 having the first time information T1, and display the confirmed first representative delta frame in front of the remaining representative delta frames Del2-Del5. In other words, when a plurality of representative delta frames overlap according to the obtained time sequence, the image processing apparatus may be configured to display the first representative delta frame Del1 at the rear, and the fifth representative delta frame Del5 at the front. Particularly, displaying at the rear or at the front refers to the effect shown by the user. In fact, it includes displaying an image of the entire area of the fifth representative delta frame Del5. In addition, the first representative delta frame Del1 may have the smallest area displayed by other delta frames.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium. The non-transitory computer-readable recording medium may include all types of recording media storing commands that may be interpreted by a computer. For example, the non-transitory computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

The present disclosure compresses and stores the same pixel among a plurality of frames into one, and separately compresses and stores a pixel corresponding to an event, thereby reducing image processing time, reducing the amount of data stored in a storage device, and as the amount of data stored in the device decreases, images stored in the storage device may be stored for a long time.

The present disclosure may store an image obtained for a longer period of time than conventionally. In other words, the present disclosure may store stored images for a long period of time. According to the present disclosure, even when a storage device having the same storage capacity as the existing one is used, more images of an event may be stored in the storage device compared to the existing one. Even if a storage device that is cheaper because it has a smaller storage capacity than the existing one is used, the present disclosure may store images obtained for a longer period of time than the existing one thus reducing the overall cost of the product.

The present disclosure may simultaneously display a plurality of images corresponding to each event. This allows users to quickly and easily confirm the image. According to the present disclosure, a plurality of images corresponding to each event and information on time are displayed together, so that an image required by a user may be easily and more accurately searched. In other words, the present disclosure may shorten the time required for an image search by a user. Accordingly, the present disclosure may improve the quality and marketability of an image processing apparatus and vehicle, and further enhance user satisfaction, improve user convenience and vehicle safety, and secure vehicle competitiveness.

What is claimed is:

1. A device, comprising:
   an input device;
   a display;
   an aquisition device including a camera;
   an image processing apparatus including a processor configured to:
   receive first and second original frames of images obtained by the image acquisition device at set time intervals;
   confirm the same pixels between the received first original frame and second original frame,
   obtain a key frame including the confirmed same pixels,
   confirm pixels different from pixels of the received first original frame among the pixels of the received second original frame,
   obtain a delta frame including the confirmed different pixels, and
   compress the key frame and the delta frame, respectively, and
   a storage device including a memory and configured to store the key frame and the delta frame compressed by the image processing apparatus,
   wherein, when a display command is received by the input device, the image processing apparatus restores the compressed key frame and delta frame stored in the storage device, and a single image by synthesizing the restored key frame and the delta frame,
   wherein the display displays the single image.

2. The device according to claim 1, wherein the image processing apparatus is configured to restore using a linear interpolation method when performing the restoration.

3. The device according to claim 1,
   wherein, when the display command is received by the input device, the image processing apparatus determines whether a plurality of delta frames are stored in the storage device, when it is determined that the plurality of delta frames are stored in the storage device, restore the stored key frame and the plurality of delta frames, respectively, and overlap the restored plurality of delta frames with the restored key frame, and
   wherein the display displays the restored plurality of delta frames overlapping the restored key frame.

4. The device according to claim 3, wherein the image processing apparatus is configured to confirm a position information of the pixels of the plurality of delta frames and determine a position for overlap based on the confirmed position information of pixels for each of the plurality of delta frames.

5. The device according to claim 3, wherein, when a selection signal of any one delta frame received by the input device, the image processing apparatus is configured control the display to display the any one delta frame differently from remaining delta frame among the plurality of delta frames.

6. The device according to claim 3, wherein, when a selection signal of any one delta frame received by the input device, the image processing apparatus is configured to synthesize only the one delta frame among the plurality of delta frames with the key frame and control the display to display the synthesized frame.

7. The device is according to claim 1, wherein the controller is configured to match time information obtained by the received second original frame with the delta frame and store the matched time information.

8. The device according to claim 1, wherein, in response to receiving environmental information by the input device, the image processing apparatus is configured to adjust at least one of brightness and color of the first and second original frames based on the received environmental information, and wherein the environmental information includes at least one of current time information, weather information, season information, and illumination information.

9. A control method, comprising:
receiving, by an image processing apparatus including a processor, a plurality of original frames for images obtained by an image acquisition device including a camera at a set time interval;
obtaining, by the image processing apparatus, a key frame having the same pixel with each other by comparing the plurality of original frames received at the set time interval;
obtaining, by the image processing apparatus, a plurality of delta frames having pixels different from the reference original frame from the remaining original frames by comparing each of the reference original frame and remaining original frames among the plurality of frames;
compressing, by the controller, the key frame and the plurality of delta frames, respectively;
storing, in a storage device including a memory, the compressed key frame and the plurality of delta frames;
restoring, by the image processing apparatus, the compressed key frame and the plurality of delta frames stored in a storage device in response to receiving a display command by an input device;
synthesizing, by the image processing apparatus, the restored key frame and the restored plurality of delta frames; and
displaying the synthesized frames through a display.

10. The control method according to claim 9, wherein the storing the plurality of delta frames includes:
confirming, by the image processing apparatus, original frames corresponding to each of the plurality of delta frames;
confirming, by the image processing apparatus, each time information in which the confirmed original frames are obtained; and
matching and storing, by the image processing apparatus, the plurality of delta frames and the respective confirmed time information.

11. The control method according to claim 10, wherein the displayng the synthesized frames through the display includes:
displaying, by the image processing apparatus, time information stored by matching with the plurality of delta frames, together.

12. The control method according to claim 11, further comprising:
in response to receiving a user selection for any one time information by the input device, displaying through the display, by the image processing apparatus, a delta frame having the selected time information differently from remaining delta frame.

13. The control method according to claim 11, further comprising:
in response to receiving a user selection for any one time information by the input device, displaying through the display, by the image processing apparatus, only the delta frame having the selected time information.

14. The control method according to claim 9, wherein the storing the plurality of delta frames includes:
confirming, by the image processing apparatus, a position information of the pixels of the plurality of delta frames, respectively; and
storing, by the image processing apparatus, a position information of pixels for each of the plurality of delta frames.

15. The control method according to claim 14, wherein the synthesizing the restored key frame and the restored plurality of delta frames includes:
synthesizing, by the image processing apparatus, the plurality of delta frames into the key frame based on position information of pixels for each of the plurality of delta frames.

16. The control method according to claim 9, further comprising:
in response to receiving environmental information from the input device, adjusting, by the image processing apparatus, at least one of brightness and color of the plurality of original frames based on the received environmental information,
wherein the environmental information includes at least one of current time information, weather information, season information, and illumination information.

17. A vehicle, comprising:
an input device;
a display;
an image acquisition device including a camera;
an image processing apparatus including a processor and configured to:
receive a plurality of original frames for images obtained by the image acquisition device at a set time interval in a parking state,
obtain a key frame having the same pixel with each other by comparing the plurality of original frames received at the set time interval,
obtain a plurality of delta frames having pixels different from the reference original frame from remaining original frames by comparing each of the reference original frame and the remaining original frames among the plurality of frames, and
compress the key frame and the plurality of delta frames, respectively; and
a storage device configured to store the key frame and the plurality of delta frames compressed by the image processing apparatus, wherein, when a display command is received by the input device, the image processing apparatus restores the compressed key frame and the compressed plurality of delta frames stored in the storage device, and generate a single image by synthesizing the restored key frame and the restored plurality of delta frames;

wherein the display displays the single image.

18. The vehicle according to claim 17, wherein the image processing apparatus is configured to;

confirm original frames corresponding to each of the plurality of delta frames, confirm each time information in which the confirmed original frames are obtained, match and store the plurality of delta frames and the respective confirmed time information, and in response to receiving the display command by the input devices, and control the display to display the stored time information corresponding to the plurality of delta frames together with the single image.

19. The vehicle according to claim 17, further comprising:
an illuminance detector configured to detect illuminance, and wherein the image processing apparatus is configured to adjust at least one of brightness and color of the plurality of original frames based on the illuminance detected by the illuminance detector.

20. The vehicle according to claim 17, further comprising:
an impact detector configured to detect external impact, and wherein the image processing apparatus is configured to determine whether an event occurs based on the impact information detected by the impact detector, and in response to determining that the event occurs, store information on the delta frame obtained at the time of the event occurrence.

21. A device, comprising:
an input device;
a display;
an image acquisition device including a camera;
an image processing apparatus including a processor and configured to:
receive first and second original frames of image obtained byimages acquisition device at set time interval;
confirm the same pixels between the received first original frame and second original frame,
obtain a key frame including the confirmed same pixels, confirm pixels different from pixels of the received first original frame among the pixels of the received second original frame,
obtain a delta frame including the confirmed different pixels, and
compress the key frame and the delta frame, respectively, and
a storage device including a memory and configured to store the key frame and the delta frame compressed by the image processing apparatus,
wherein, in response to receiving a playback command from the input device while a plurality of delta frames compressed by the image processing apparatus are stored in the storage devicve, the image processing apparatus is configured to restore the compressed key frame and the compressed plurality of delta frames, respectively, and control the display to simultaneously play the restored plurality of delta frames in the restored key frame, wherein the display displays simultaneously play the restored plurality of delta frames in the restored key frame.

22. The device according to claim 21, wherein the plurality of delta frames include pixels obtained from images obtained by the image acquisition device at the same time.

23. The device according to claim 21, wherein the plurality of delta frames include pixels obtained from images obtained by the image acquisition device at different times.

24. A device, comprising:
an input device;
a display;
an image acquisition device including a camera,
an image processing apparatus configured to:
receive first and second original frames of images obtained by the image acquisition device at set time interval, and receive an event information of a vehicle,
confirm the same pixels between the received first original frame and second original frame,
obtain a key frame including the confirmed same pixels,
confirm pixels different from pixels of the received first original frame among the pixels of the received second original frame,
obtain a delta frame including the confirmed different pixels, and
compress the key frame and the delta frame, respectively; and
a storage device including a memory and configured to store the key frame and the delta frame compressed by the image processing apparatus,
wherein, in response to receiving a display command from the input device while a plurality of delta frames compressed by the image processing apparatus are stored in the storage device, the image processing apparatus is configured to restore the compressed key frame and the compressed plurality of delta frames, respectively, and control the display to simultaneously display the restored plurality of delta frames in the restored key frame,
wherein the image processing apparatus is configured to confirm the first delta frame obtained at the time when the event information is received among the plurality of delta frames, when a partial area of the first delta frame overlaps with a partial area of a partial second delta frame among the remaining delta frames, control the entire area of the first delta frame to be displayed.

25. The device according to claim 24, wherein the controller is configured to control non-display of a partial area of the second delta frame overlapped with a partial area of the first delta frame.

26. A device, comprising:
an input device;
a display;
an image acquisition device including a camera;
an image processing apparatus including a processor and configured to:
receive first and second original frames of images obtained by the image acquisition device at set time interval, and receive an event information of a vehicle,
confirm the same pixels between the received first original frame and second original frame,
obtain a key frame including the confirmed same pixels, confirm pixels different from pixels of the received first original frame among the pixels of the received second original frame, obtain a delta frame including the confirmed different pixels, and compress the key frame and the delta frame, respectively, and a storage device including a memory and configured to store the key frame and the delta frame compressed by the image processing apparatus, wherein, in response to receiving a playback command from the input device while a plurality of delta frames compressed by the image processing apparatus are stored in the storage device, the image processing apparatus is configured to restore the compressed key frame and the compressed plurality of delta frames, respectively, and control the display to simultaneously play the restored plurality of delta frames in the restored key frame, wherein the image processing apparatus is configured to confirm the first delta frame obtained at a first time point before a first predetermined time from the time point at which the event information is received among the plurality of delta frames, confirm the second delta frame obtained at a second time point after a second predetermined time from the time point at which the event information is received, simultaneous playback of the first delta frame and the second delta frame obtained during a time between the first time point and the second time point.

* * * * *